United States Patent
Kim

(10) Patent No.: US 8,666,446 B2
(45) Date of Patent: Mar. 4, 2014

(54) MOBILE COMMUNICATION TERMINAL WITH POWER-SAVING MOTION SENSOR AND METHOD FOR THE SAME

(75) Inventor: Jong Hwan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 629 days.

(21) Appl. No.: 12/509,399

(22) Filed: Jul. 24, 2009

(65) Prior Publication Data

US 2010/0099457 A1    Apr. 22, 2010

(30) Foreign Application Priority Data

Oct. 16, 2008    (KR) .................. 10-2008-0101546

(51) Int. Cl.
*H04M 1/00*    (2006.01)

(52) U.S. Cl.
USPC .......... 455/556.1; 455/566; 353/122; 353/31; 353/39; 353/119; 353/25; 345/1.1; 345/156; 345/166

(58) Field of Classification Search
None
See application file for complete search history.

(56) References Cited

U.S. PATENT DOCUMENTS

| | | | |
|---|---|---|---|
| 2003/0103091 A1 | 6/2003 | Wong et al. | |
| 2005/0090290 A1* | 4/2005 | Hama et al. | 455/566 |
| 2006/0017692 A1 | 1/2006 | Wehrenberg et al. | |
| 2006/0211454 A1* | 9/2006 | Park et al. | 455/566 |
| 2007/0035616 A1* | 2/2007 | Lee et al. | 348/14.16 |
| 2007/0085759 A1* | 4/2007 | Lee et al. | 345/1.1 |
| 2007/0229650 A1 | 10/2007 | McKay | |
| 2007/0298751 A1 | 12/2007 | Wulff | |
| 2009/0036158 A1* | 2/2009 | Fujinawa et al. | 455/556.1 |
| 2009/0143098 A1* | 6/2009 | Shiono | 455/556.1 |
| 2009/0144661 A1* | 6/2009 | Nakajima et al. | 715/835 |
| 2009/0310091 A1* | 12/2009 | Nozaki et al. | 353/85 |

FOREIGN PATENT DOCUMENTS

| | | |
|---|---|---|
| CN | 101006709 | 7/2007 |
| EP | 1670216 | 6/2006 |
| EP | 1924090 | 5/2008 |
| WO | WO 2006/027901 | * 3/2006 |
| WO | WO 2007/029805 | * 3/2007 |

OTHER PUBLICATIONS

The State Intellectual Property Office of the People's Republic of China Application Serial No. 200910169003.7, Office Action dated Jul. 25, 2013, 8 pages.

* cited by examiner

*Primary Examiner* — Rafael Pérez-Gutiérrez
*Assistant Examiner* — Keith Fang
(74) *Attorney, Agent, or Firm* — Lee, Hong, Degerman, Kang & Waimey

(57) ABSTRACT

A mobile communication terminal and power saving method thereof are disclosed, by which display information can be outputted to an external projection plane using a projector module. Accordingly, if an event by a system or user occurs, power saving can be performed by controlling an operation of the projector module. A mobile terminal may include a terminal body, a motion sensor configured to detect a motion of the terminal body, a projector module configured to project an image onto an external surface, a power supply configured to supply power to the projector module, and a controller configured to control an operation of the projector module and to discontinue the supply of power to the projector module in response to detecting the motion by the motion sensor.

12 Claims, 31 Drawing Sheets

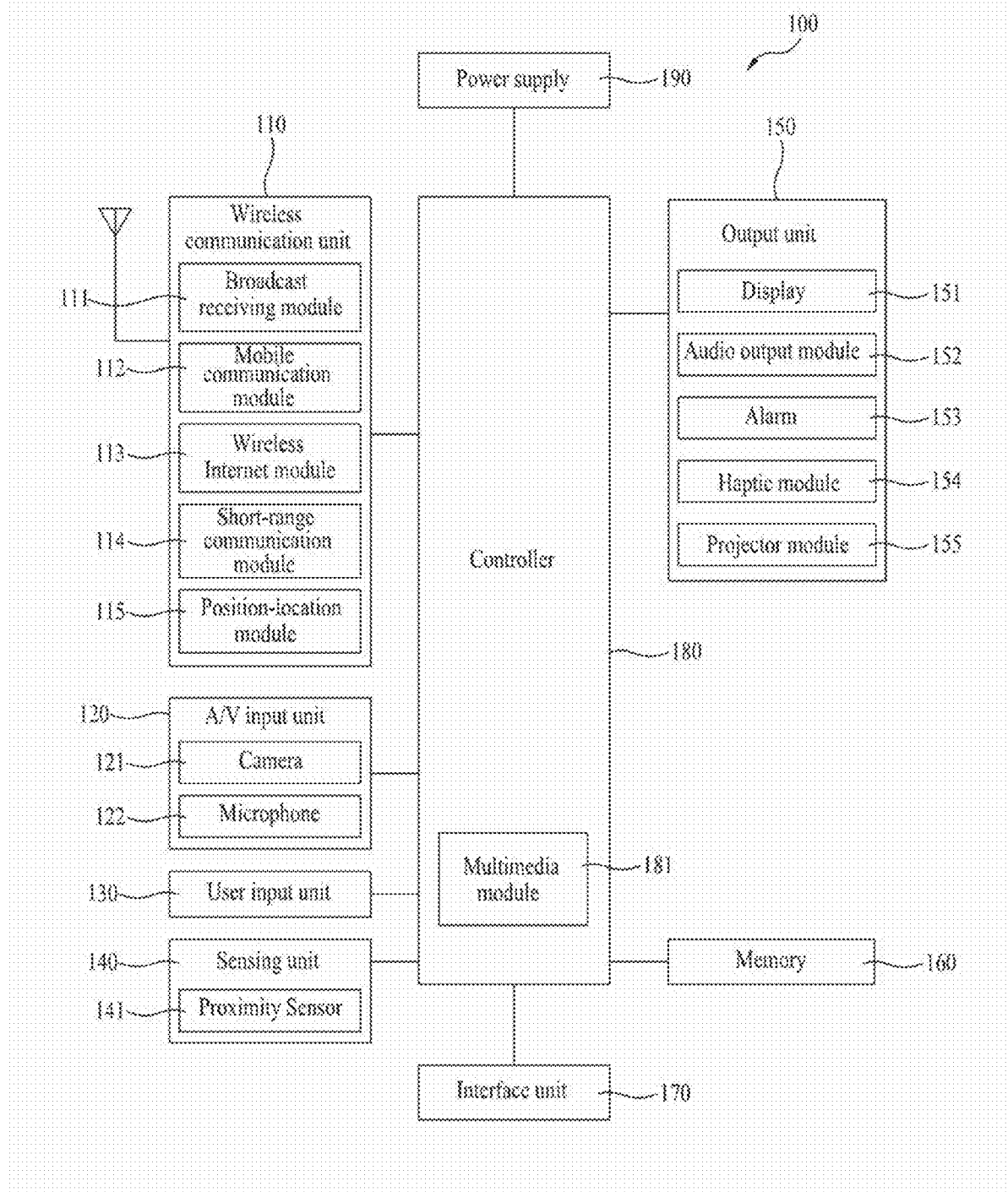

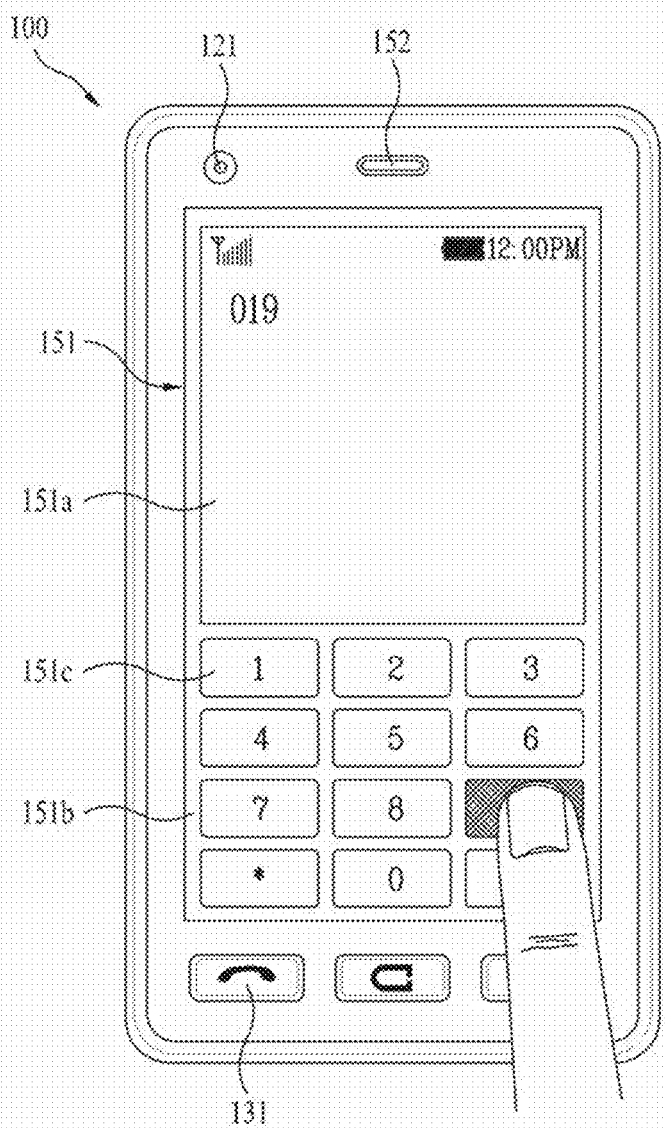

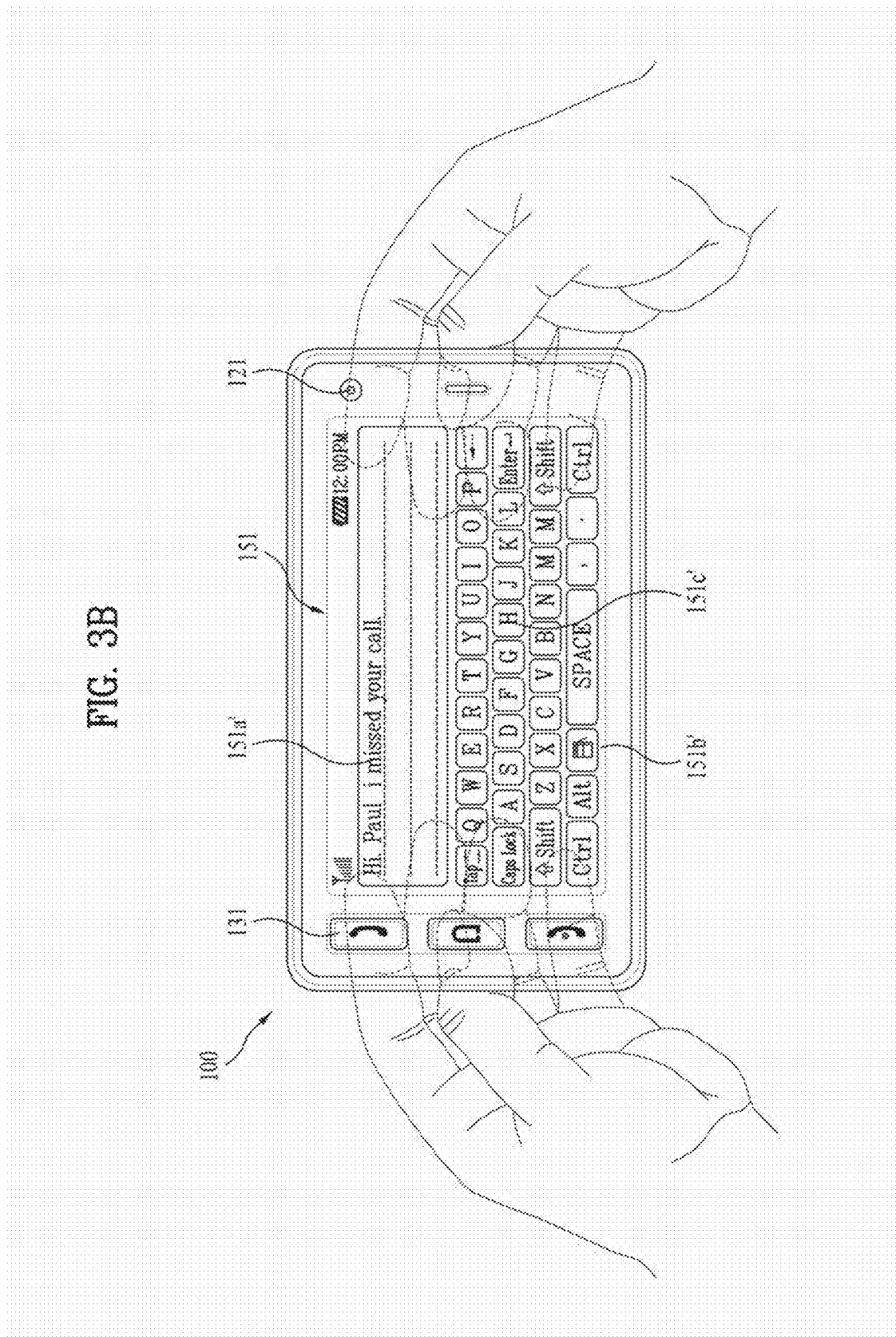

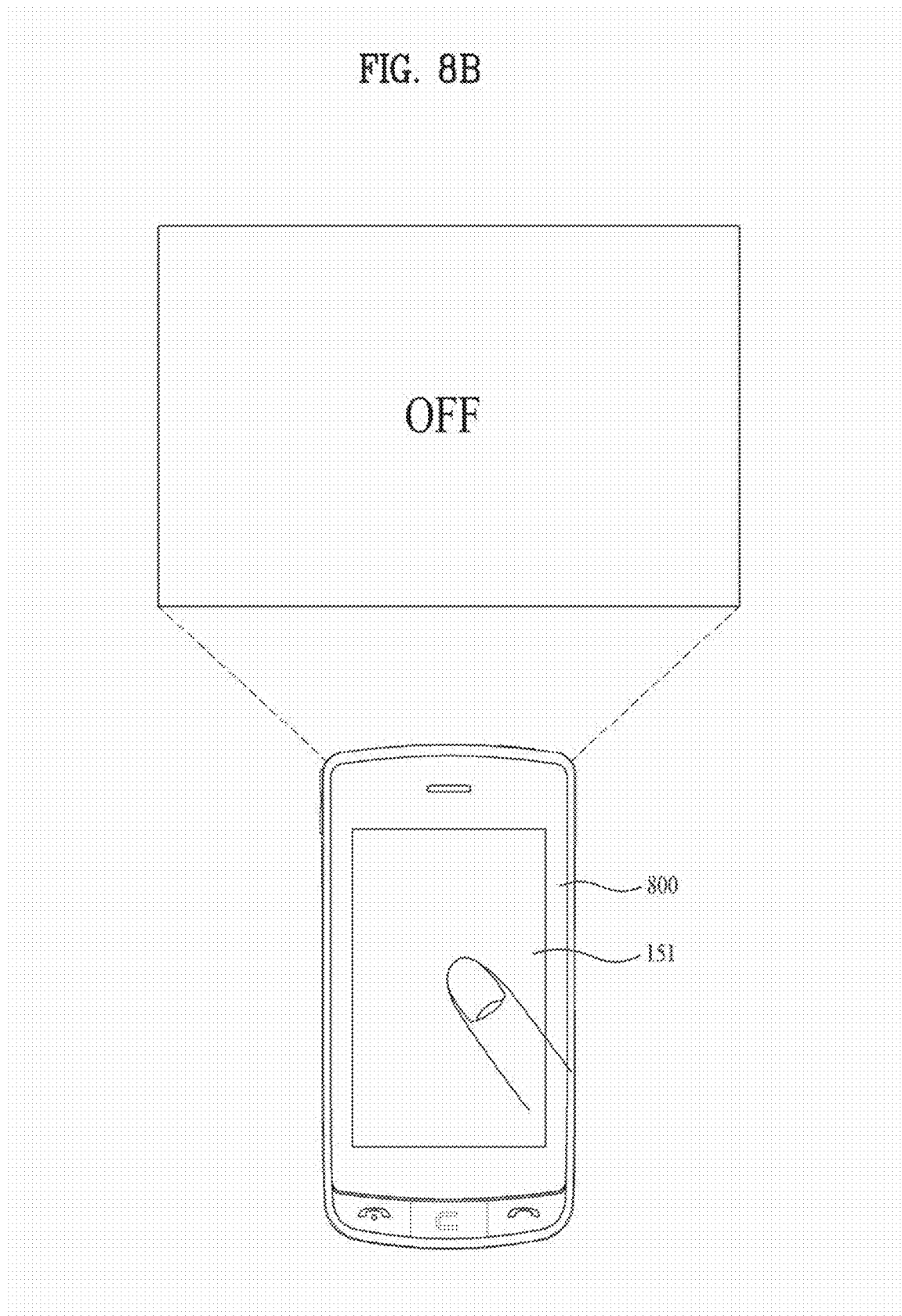

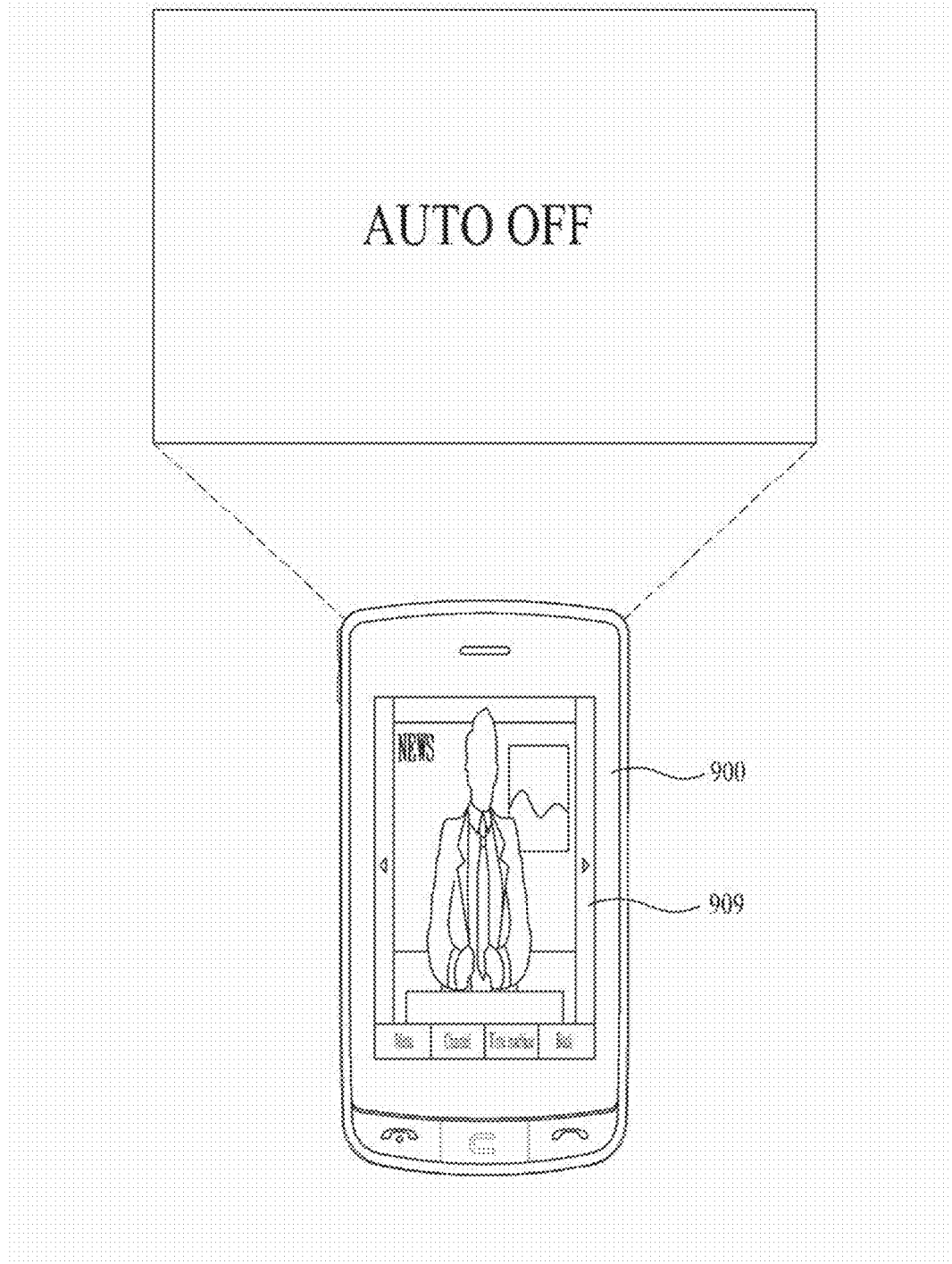

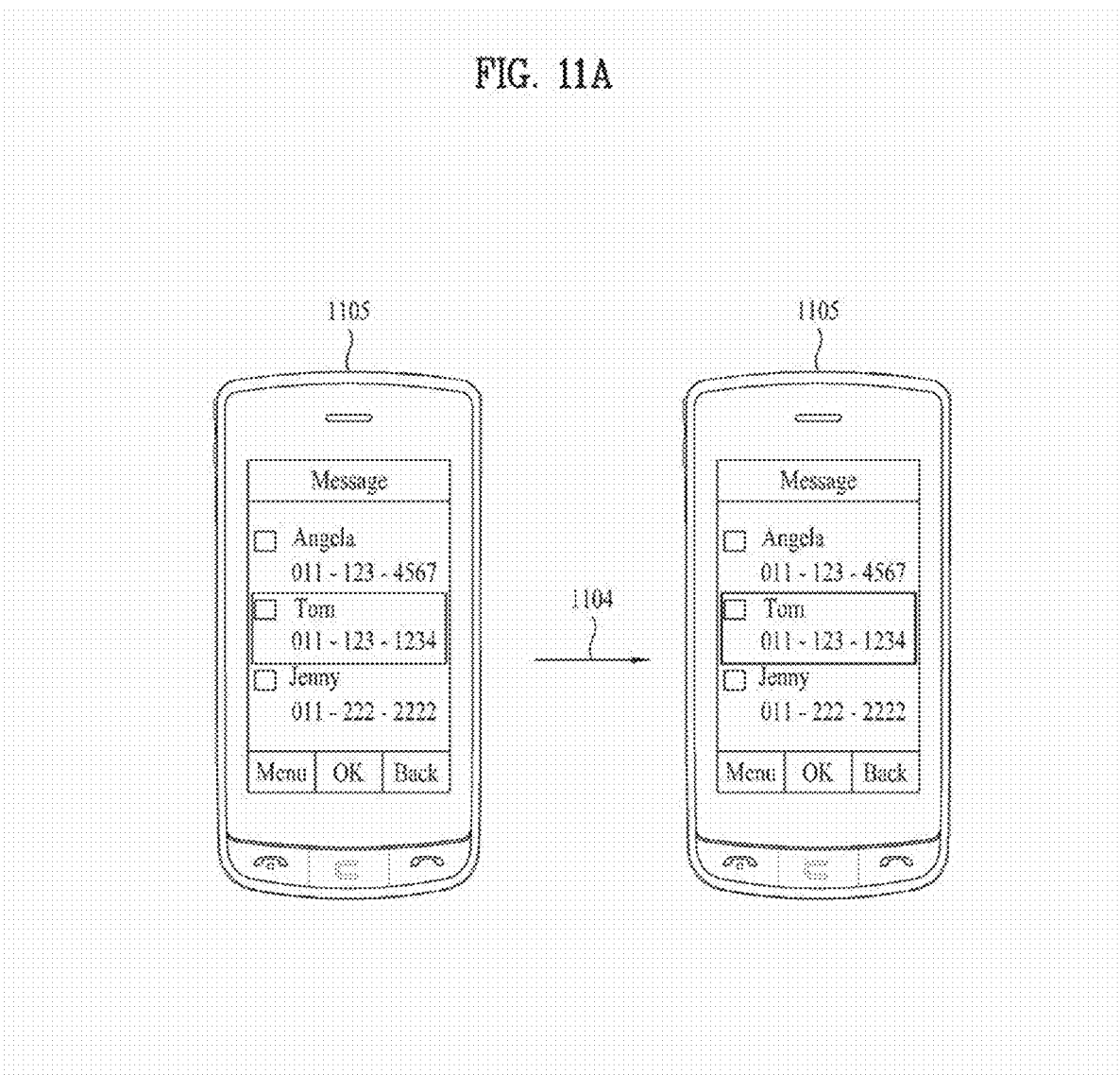

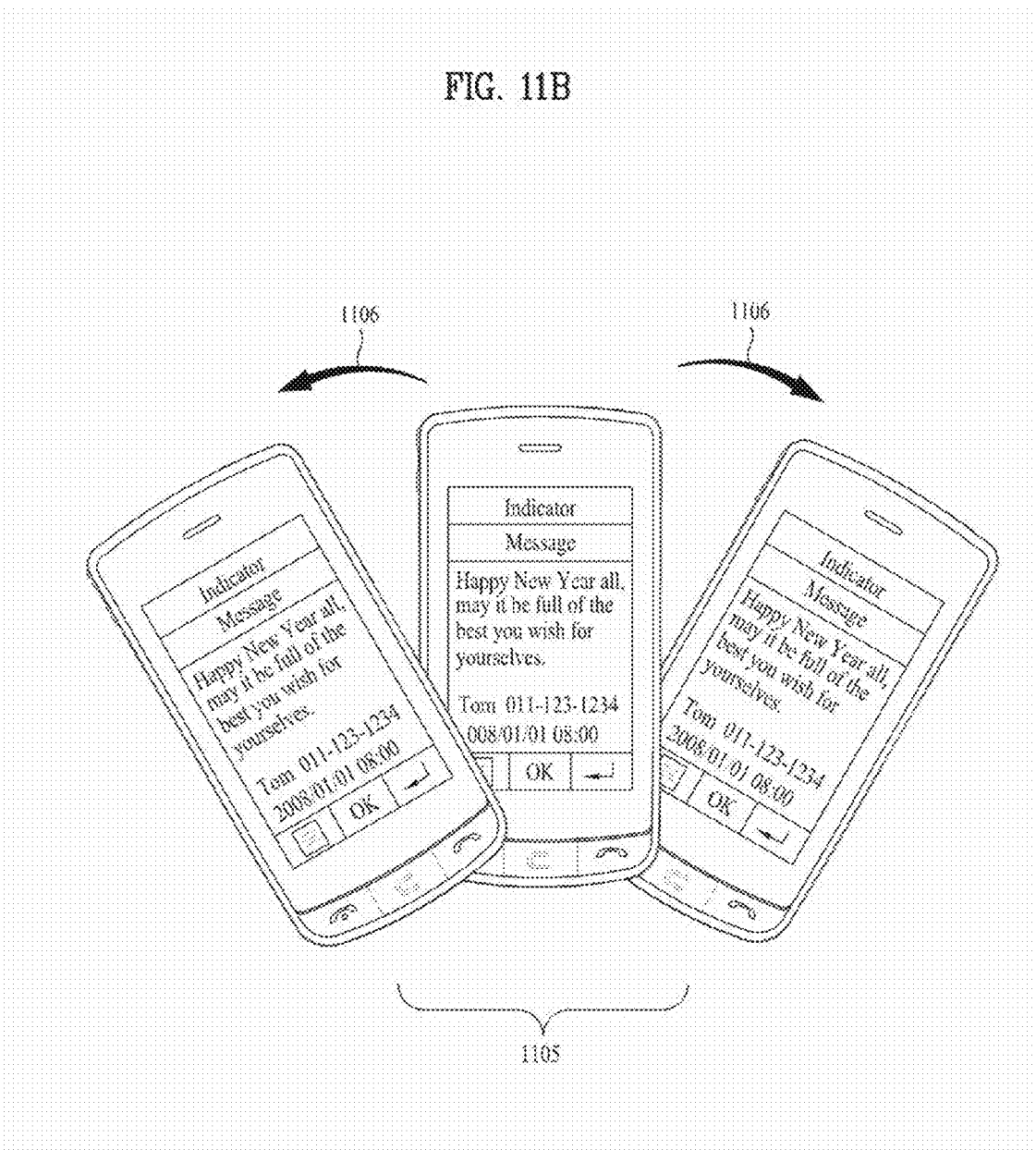

MOBILE COMMUNICATION TERMINAL WITH POWER-SAVING MOTION SENSOR AND METHOD FOR THE SAME

CROSS-REFERENCE TO RELATED APPLICATIONS

Pursuant to 35 U.S.C. §119(a), this application claims the benefit of earlier filing date and right of priority to Korean Application No. 10-2008-0101546, filed on Oct. 16, 2008, the contents of which are hereby incorporated by reference herein in their entirety.

BACKGROUND OF THE INVENTION

1. Field of the Invention

The present invention relates to a mobile communication terminal, and more particularly, to a mobile communication terminal and power saving method thereof. Although the present invention is suitable for a wide scope of applications, it is particularly suitable for a mobile terminal provided with a projector module.

2. Description of Related Art

A size of a display screen provided to a mobile terminal is considerably limited due to, among other things, competing design considerations of the mobile terminal. Therefore, the demand for a technology for providing a wider display screen is rising. Bigger display screens naturally give rise to considerations of operation power in mobile terminals and the attendant need to be judicious about the use of such power.

SUMMARY OF THE INVENTION

Accordingly, the present invention is directed to a mobile communication terminal and power saving method thereof that substantially obviate one or more problems due to limitations and disadvantages of the related art.

In one aspect, a mobile terminal may include a terminal body, a motion sensor configured to detect a motion of the terminal body, a projector module configured to project an image onto an external surface, a power supply configured to supply power to the projector module, and a controller configured to control an operation of the projector module and to discontinue the supply of power to the projector module in response to detecting the motion by the motion sensor.

In another aspect, a mobile terminal may include a memory configured to store at least one user setting, a projector module configured to project an image onto an external surface, a power supply configured to supply power to the projector module, and a controller configured to detect an occurrence of a specified event representative of a status change while the projector module is in operation and to discontinue the supply of power to the projector module responsive to the occurrence of the event, wherein the discontinuing the supply of power is performed in accordance with the stored at least one user setting.

In still another aspect, a method for saving power in a mobile terminal having a terminal body and configured with a projector module may include supplying power to the projector module, projecting an image from the projector module onto an external surface, detecting a motion of the terminal body by a motion sensor located in the terminal body, and discontinuing the supply of power to the projector module in response to the detecting the motion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIG. 3A and FIG. 3B are front diagrams of a mobile terminal according to one embodiment of the present invention for explaining one operational status of the mobile terminal, respectively;

FIGS. 8A to 8D are exemplary diagrams for embodiments of discontinuing a supply of power to a projector module according to a user event occurrence;

FIGS. 9A to 9C are exemplary diagrams for embodiments of controlling a power savings according to a lapse of time;

FIGS. 11A to 11C are exemplary diagrams for embodiments of a motion of a terminal body;

DETAILED DESCRIPTION OF THE INVENTION

Figure 2A:
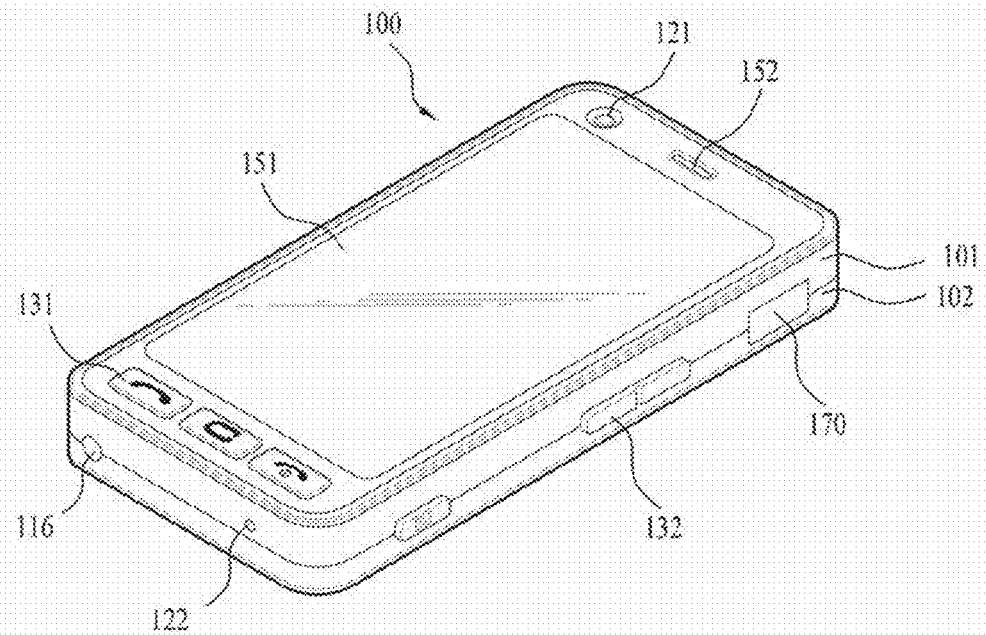
FIG. 2A is a front perspective diagram of a mobile terminal according to one embodiment of the present invention.

Mobile terminals for purposes of this disclosure may generally include a mobile phone, a smart phone, a laptop computer, a digital broadcast terminal, a PDA (personal digital assistant), a PMP (portable multimedia player), a navigation system or similar portable device.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia messages, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), the display unit 151 may be used as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, the touch sensor may be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to determine whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. An action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 may output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 is able to operate in association with a web storage medium for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations.

Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
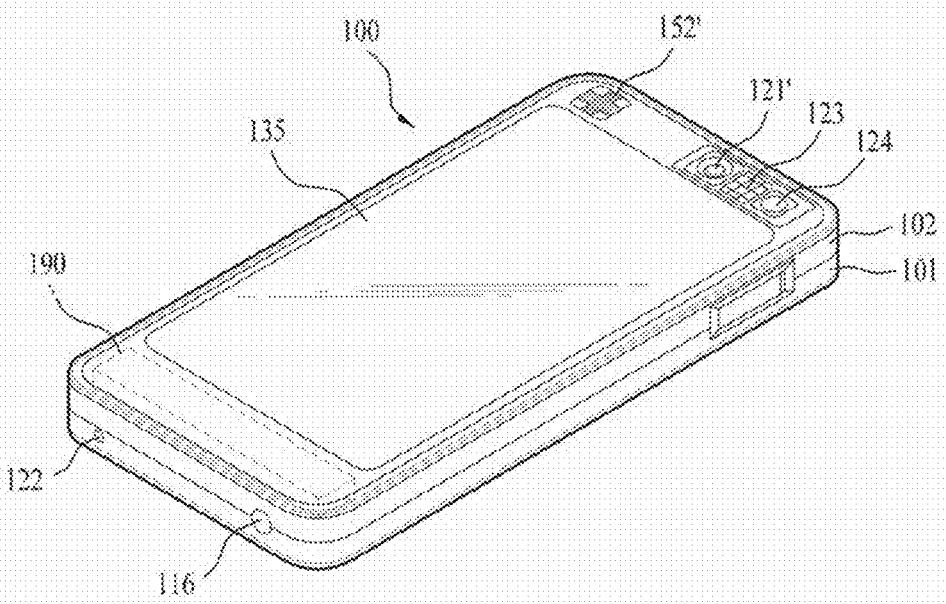
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, the visual information may be recognized via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3A and FIG. 3B as follows.

FIG. 3A and FIG. 3B are front-view diagrams of a terminal according to one embodiment of the present invention for explaining an operational state thereof.

First of all, various kinds of visual information can be displayed on the display unit 151. And, this information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display unit 151 can be configured to change an output picture according to the arranged direction of the terminal body.

FIG. 3B shows that a text input mode is activated in the terminal.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (such as touchpad 135 in FIG. 2B), the characters, symbols and digits corresponding to the touched soft keys are output to the output window 151a'. Thus, the touch input via the touchpad 135 is advantageous in that the soft keys 151c' can be prevented from being blocked by a finger in case of touch, which is compared to the touch input via the display unit 151. In case that the display unit 151 and the touchpad 135 are configured to be transparent, the position of the fingers located at the backside of the terminal body may be visually identified. Hence, more accurate touch inputs are possible.

Besides, the display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with a case that both of the display unit (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad 135.

The proximity sensor 141 described with reference to FIG. 1 is explained in detail with reference to FIG. 4 as follows.

Figure 4:
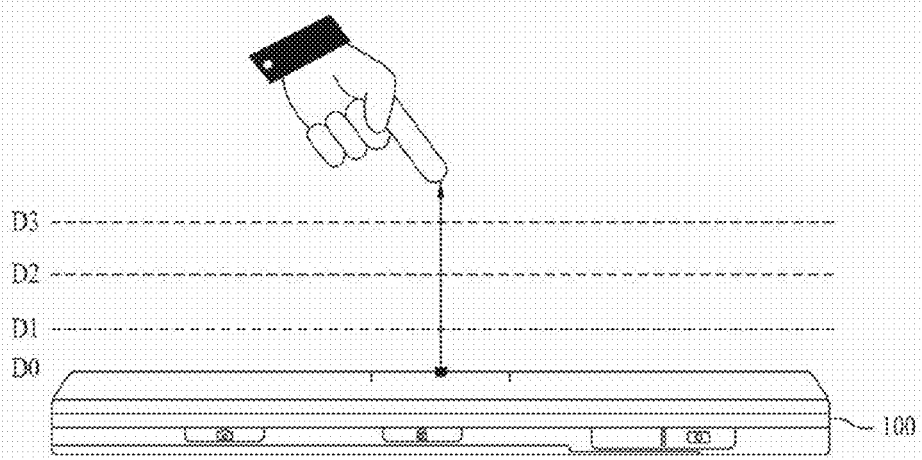
FIG. 4 is a side view of a mobile terminal to explain the concept of proximity depth of a proximity sensor.

FIG. 4 is a conceptual diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5:
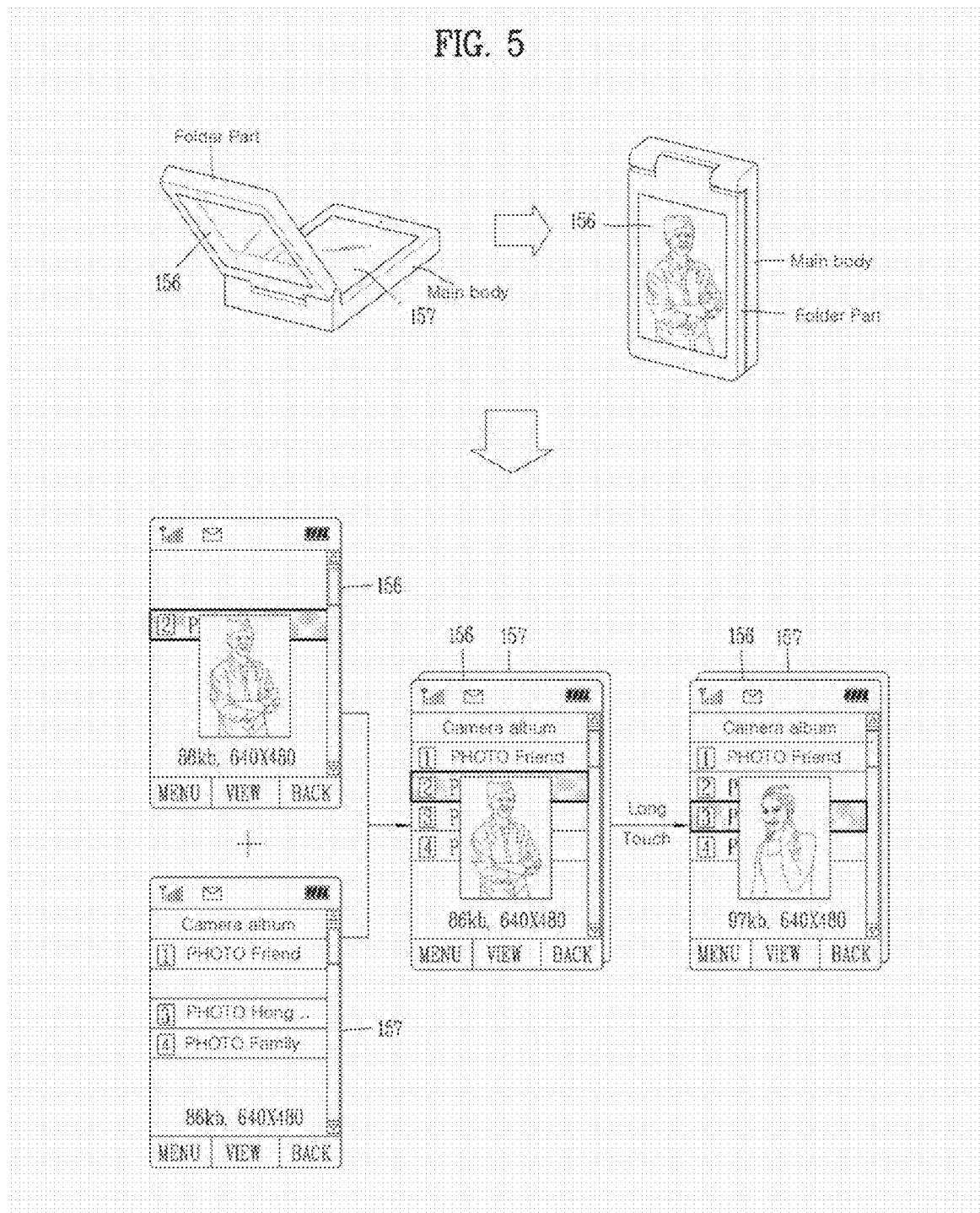
FIG. 5 is a flow diagram to explain the concept of a method of controlling a touch action on a pair of display units overlapped with each other.

FIG. 5 is a conceptual diagram for exampling a method of controlling a touch action in a state that a pair of display units 156 and 157 are overlapped with each other.

Referring to FIG. 5, a terminal shown in the drawing is a folder type terminal in which a folder part is connected to a main body in a manner of being folded or unfolded.

A first display unit 156 provided to the folder part is a light-transmittive or transparent type such as TOLED, while a second display unit 157 provided to the main body may be a non-transmittive type such as LCD. Each of the first and second display units 156 and 157 can include a touch-inputtable touchscreen.

For instance, if a touch (contact touch or proximity touch) to the first display unit or TOLED 156 is detected, the controller 180 selects or runs at least one image from an image list displayed on the TOLED 156 according to a touch type and a touch duration.

In the following description, a method of controlling information displayed on a different display unit or an LCD 157 in case of an touch to the TOLED 156 externally exposed in an overlapped configuration is explained, in which the description is made with reference to input types classified into a touch, a long touch, a long-touch & drag and the like.

In the overlapped state (a state that mobile terminal is closed or folder), the TOLED 156 is configured to be overlapped with the LCD 157. In this state, if a touch different from a touch for controlling an image displayed on the TOLED 156, e.g., a long touch (e.g., a touch having a duration of at least 2 seconds) is detected, the controller 180 enables at least one image to be selected from an image list displayed on the LCD 157 according to the touched touch input. The result from running the selected image is displayed on the TOLED 156.

The long touch is usable in selectively shifting a specific one of entities displayed on the LCD 157 to the TOLED 156 (without an action for running the corresponding entity). In particular, if a user performs a long touch on a prescribed region of the TOLED 156 corresponding to a specific entity of the LCD 157, the controller 180 controls the corresponding entity to be displayed by being shifted to the TOLED 156.

Meanwhile, an entity displayed on the TOLED 156 can be displayed by being shifted to the LCD 157 according to such a prescribed touch input to the TOLED 156 as flicking, swirling and the like. In the drawing, exemplarily shown is that a second menu displayed on the LCD 157 is displayed by being shifted to the TOLED 156.

In case that another input, e.g., a drag is additionally detected together with a long touch, the controller 180 executes a function associated with an image selected by the long touch so that a preview picture for the image can be displayed on the TOLED 156 for example. In the drawing, exemplarily shown is that a preview (picture of a male) for a second menu (image file) is performed.

While the preview image is outputted, if a drag toward a different image is additionally performed on the TOLED 156 by maintaining the long touch, the controller 180 shifts a selection cursor (or a selection bar) of the LCD 157 and then displays the image selected by the selection cursor on the preview picture (picture of female). Thereafter, after completion of the touch (long touch and drag), the controller 180 displays the initial image selected by the long touch.

The touch action (long touch and drag) is identically applied to a case that a slide (action of a proximity touch corresponding to the drag) is detected to together with a long proximity touch (e.g., a proximity touch maintained for at least 2 or 3 seconds) to the TOLED 156.

In case that a touch action differing from the above-mentioned touch actions is detected, the controller 180 is able to operate in the same manner of the general touch controlling method.

The method of controlling the touch action in the overlapped state is applicable to a terminal having a single display. And, the method of controlling the touch action in the overlapped state is applicable to terminals differing from the folder type terminal having a dual display as well.

Figure 6A:
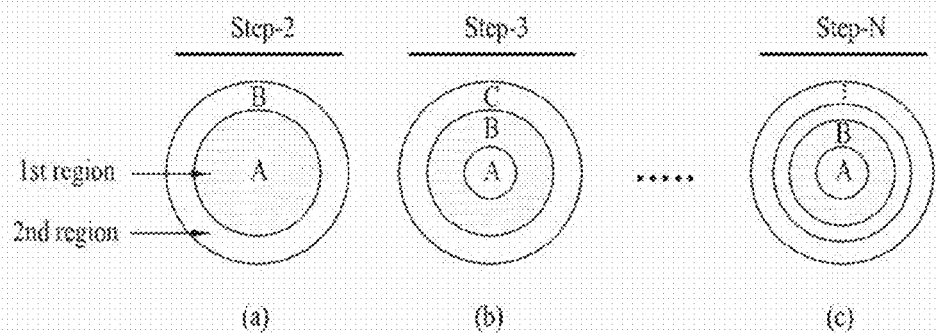
FIG. 6A and FIG. 6B are diagrams to explain the concepts of a proximity touch recognizing area for detecting a proximity signal and a haptic area for generating a tactile effect, respectively.
Figure 6B:
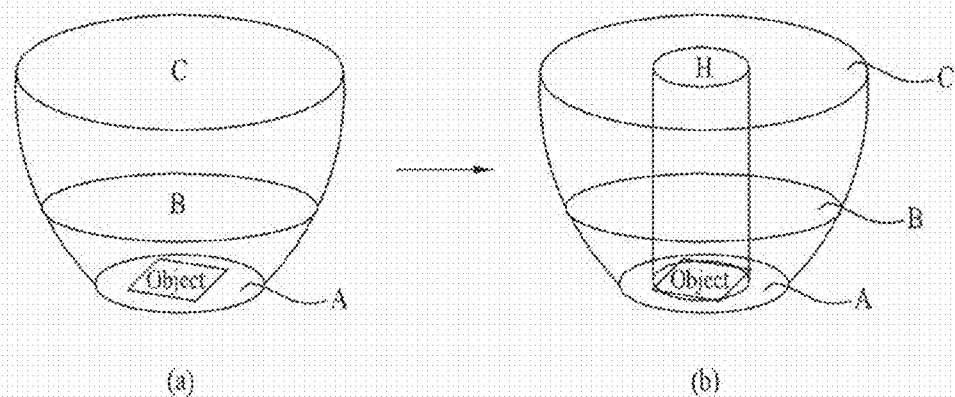

FIG. 6A and FIG. 6B are diagrams for the description of a proximity touch recognition area and a tactile effect generation region.

FIG. 6A represents such an object as an icon, a menu item and the like in a circle type for clarity and convenience of explanation.

A region for displaying an object on the display unit 151, as shown in (a) of FIG. 6A, can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, the haptic region may be set for generating the tactile effect to be different from the proximity touch recognition region for detecting the proximity signal. In particular, the haptic region may be set to be narrower or wider than the proximity touch recognition region. For instance, in (a) of FIG. 6A, the proximity touch recognition region may be set to the area including both of the first and second regions A and B. And, the haptic region may be set to the first region A.

The region having the object displayed therein may be discriminated into three regions A, B and C as shown in (b) of FIG. 6A. Alternatively, the region having the object displayed therein may be discriminated into N regions (N>4) as shown in (c) of FIG. 6A. Each of the divided regions may be configured to generate a tactile effect having a different strength or pattern. In case that a region having a single object represented therein is divided into at least three regions, the haptic region and the proximity touch recognition region may be set to differ from each other according to a use environment.

A size of the proximity touch recognition region of the display unit 151 may be configured to vary according to a proximity depth. In particular, referring to (a) of FIG. 6B, the proximity touch recognition region is configured to decrease by C→B→A according to the proximity depth for the display unit 151. On the contrary, the proximity touch recognition region is configured to increase by C→B→A according to the proximity depth for the display unit 151. Despite the above configuration, the haptic region may be set to have a predetermined size, as the region 'H' shown in (b) of FIG. 6B, regardless of the proximity depth for the display unit 151.

In case of dividing the object-displayed region for the setting of the haptic region or the proximity touch recognition region, one of various schemes of horizontal/vertical division, radial division and combinations thereof may be used as well as the concentric circle type division shown in FIG. 6A.

Figure 15A:
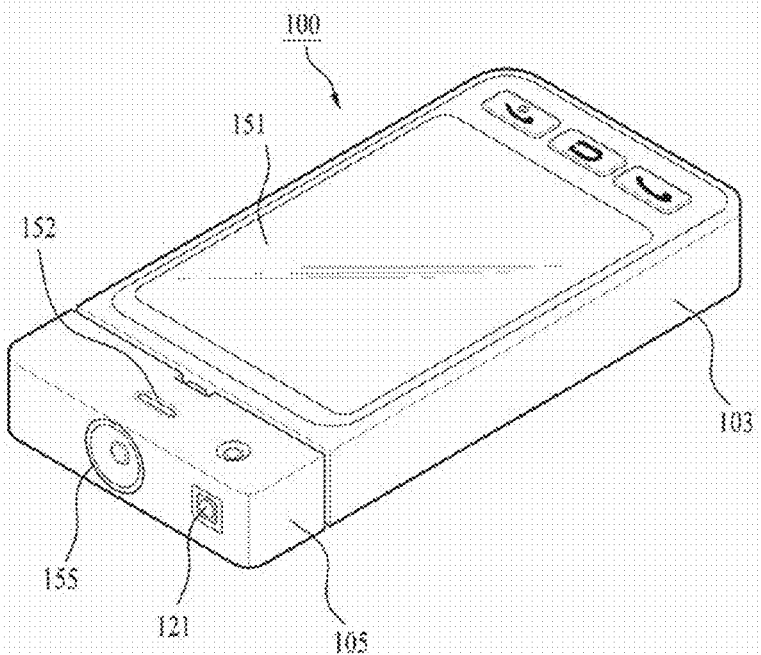
FIG. 15A and FIG. 15B are perspective diagrams of a mobile terminal equipped with a projector module.
Figure 15B:
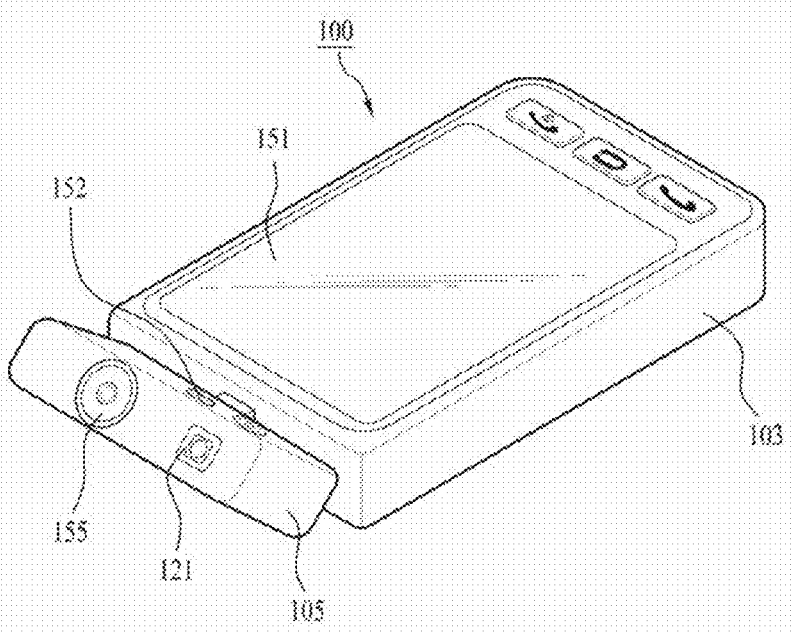

FIGS. 15A and 15B illustrate an exemplary mobile terminal configured with a projector module. Referring to FIG. 15A, a projector body 105 having a projector module 155 can be rotatably coupled to a main body 103 of the mobile terminal.

In particular, the projector body 105 can be hinged to the main body 103. A projected angle of an image, which is projected using the projector module 155 provided to the projector body 105, can be controlled. A camera 121 can be provided to the projector body 105 to photograph the image projected by the projector module 155.

Figure 7A:
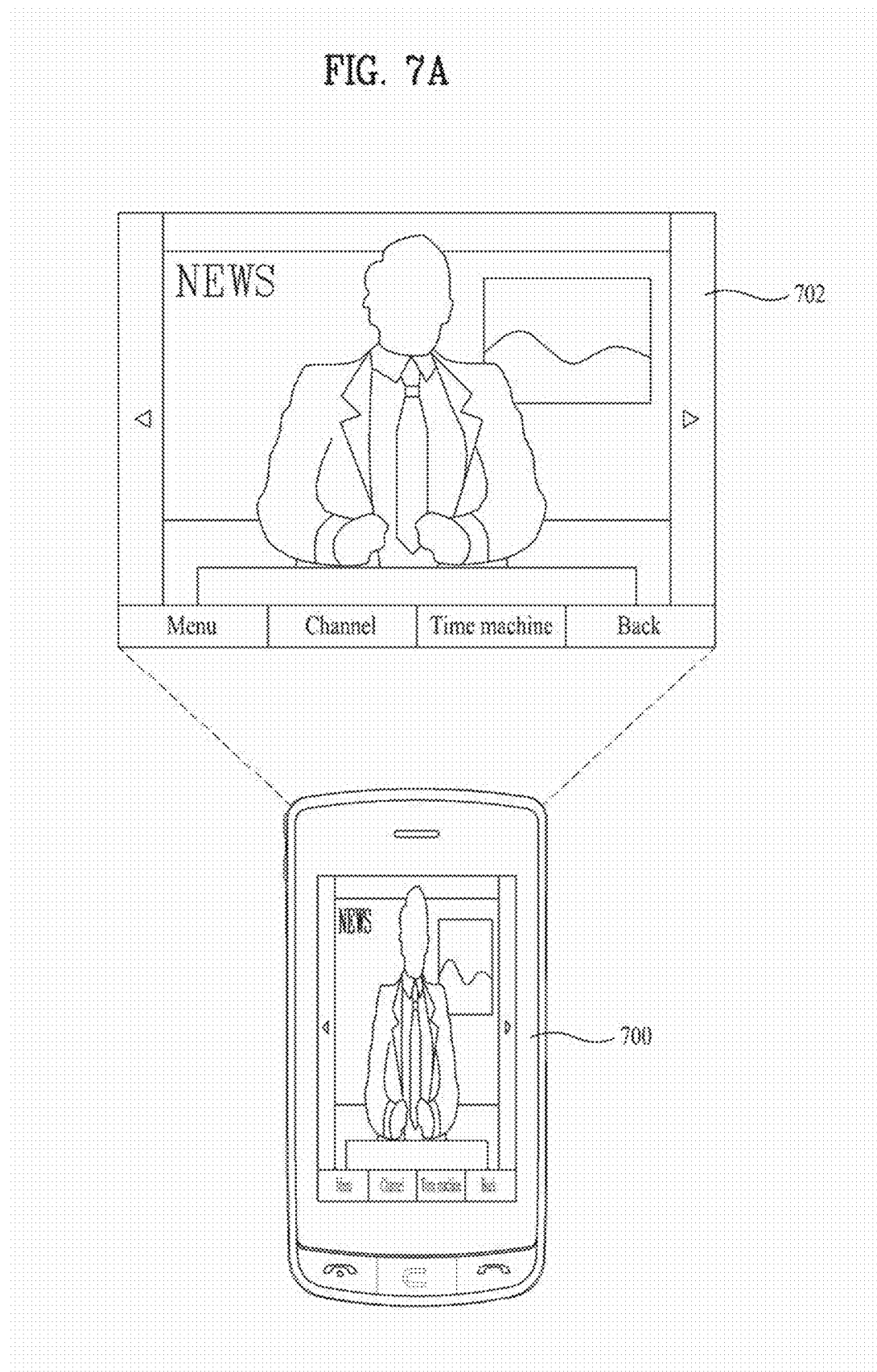
FIGS. 7A to 7D are exemplary diagrams for embodiments of discontinuing a supply of power to a projector module according to a system event occurrence.
Figure 7B:
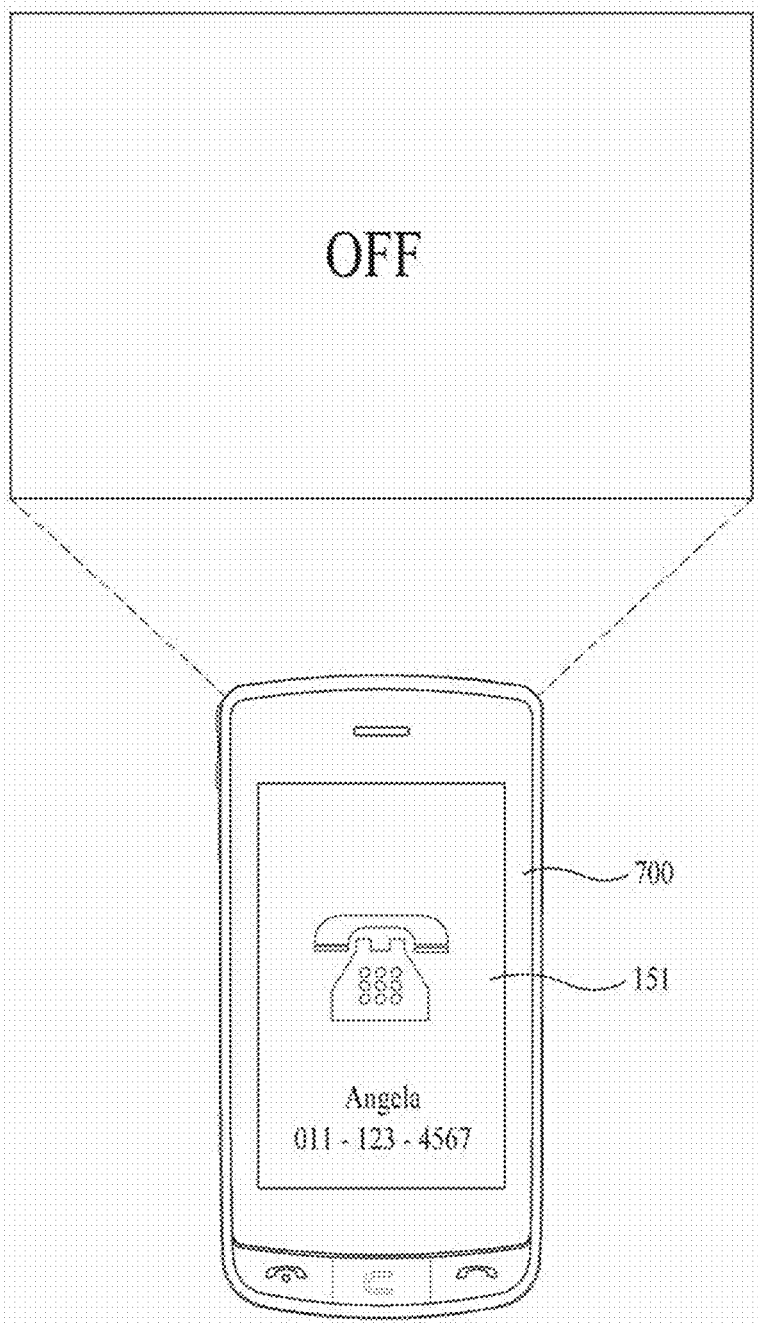
Figure 7C:
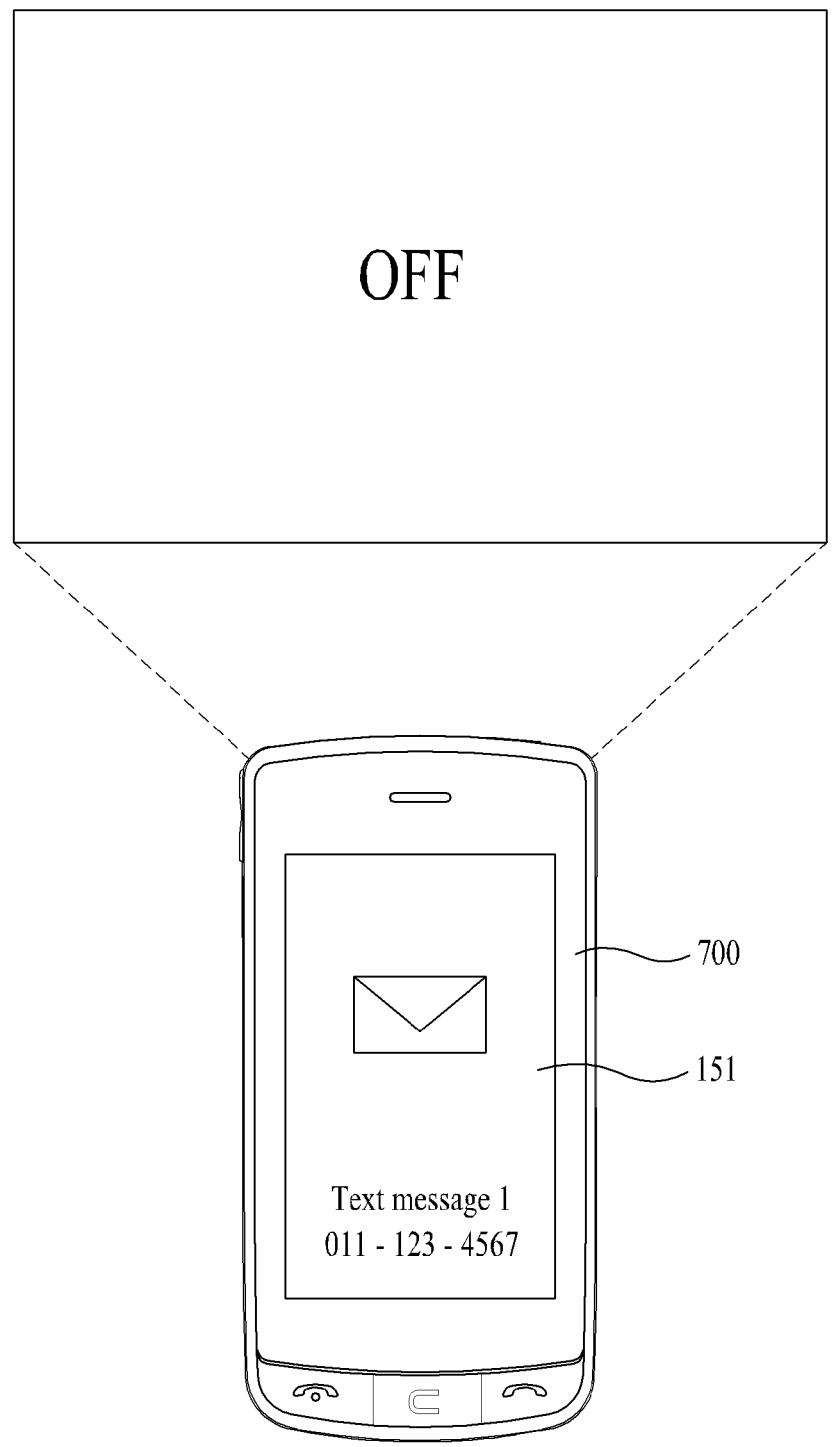
Figure 7D:
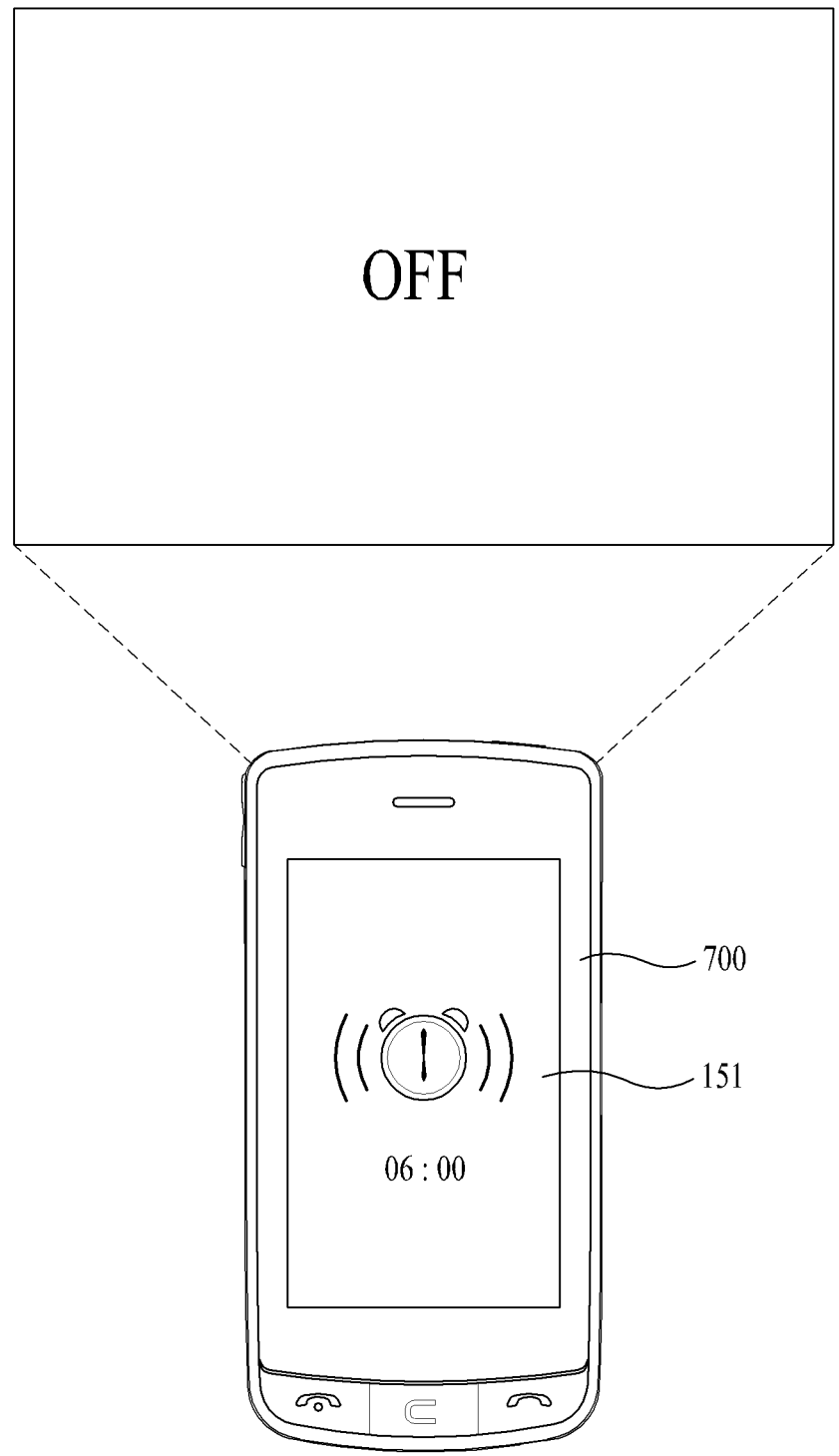

FIG. 7A shows a status before the projector body 105 rotatably coupled to the main body 103 is rotated, and FIG. 7B shows a status after the projector body 105 has been rotated.

FIGS. 7A to 7D are exemplary diagrams for embodiments of discontinuing the supply of power to a projector module according to a system event occurrence. For purposes of this disclosure, discontinuing the supply of power refers to any state where operation of the projector module is terminated such that the projector module is no longer projecting an image projected as in normal operation.

FIG. 7A shows that prescribed data is output to a projection plane 702 using a projector module located on the mobile terminal 700. This exemplary diagram illustrates that a digital multimedia broadcast is viewed using a projector module.

If a call is received, call reception information, as shown in FIG. 7B, is displayed on the display unit 151 and an operation power of a projector module is automatically cut off. In order to speak by a mobile communication terminal, a user typically has to hold the terminal in hand next to his or her ear. Therefore, in this example, it is desirable to pause an image display currently driven by the projector module.

If an earphone is connected to the terminal, conversation by the terminal may be possible, and the mobile terminal may be configured in specific instances to continue to maintain power to the projector module in the case where a user receives a call while using an earphone.

This exemplary diagram shows that an operation power of a projector module is automatically cut off if a call is received. Yet, in some instances, it may be an unnecessary incoming call or less important than the current image projection via a projector module, such that an automatic cutoff of power is not necessarily desired in all situations. Therefore, in an embodiment, instead of automatically discontinuing a power of a projector module according to a user setting, only if a phone number of an incoming call is first confirmed and the call connection is then selected is the power of the projection module then cut off by the controller.

Moreover, in another embodiment, it is possible to output call reception information to a prescribed area of a screen of the display unit. It is also possible to output call reception information to be overlapped with a projected multimedia broadcast. In this manner, a user can readily identify the caller's information while maintaining a focus on the projector's output and make a decision about whether to interrupt the projected display to take the call, for example.

The above-described methods are equally applicable to a case of a text message reception that can occur as a system event. In particular, if a text is received while a projector module is being driven, text message reception information may be displayed on the display unit. If so, referring to FIG. 7C, a power applied to the projector module that was outputting the display information on the projection plane may be discontinued.

Optionally, after a fact of a text message reception has been displayed on a portion of a projection plane, if a user that wishes to proceed to view the text message presses a prescribed button to access the text message, a power applied to a projector module can then be discontinued.

Optionally, if a user of the terminal does not wish to be interrupted by text messages from one or more other persons displayed through a projector module, a power of the projector module is not discontinued. Thus, various situations can take place. In an aspect, a controller reads a setup value for a projector module control according to each situation from a memory storing user setup information, and then outputs a control signal corresponding to an applicable event. The setup information stored in memory may include parameters and user preferences regarding whether power should be automatically cut off when calls and texts are received as described above, or when other events occur. The setup information may include user preferences regarding whether information concerning telephone numbers and caller identification or text identification should be projected through the display as described above, for example, to give a user an option to take the call or read the text and to thereby have the power to the projector be shut off in response to the user's further actions.

For instance, if an originator of a received message is important, 'check received information' will be displayed in a memory at any time and a corresponding text message can be displayed through a projector. If it is set to a privacy protection person, message reception information is outputted to a display unit only. If a text message check function key is manipulated, a power of a projector module can be cut off.

If a morning call/alarm event, which is another system event, set by a user is activated, an image display operation through a projector module may be unnecessary. In this case, referring to FIG. 7D, when an alarm function or a morning call operation is performed by the mobile terminal 700, corresponding information may be displayed on the display unit 151 but an operation of a projector module may be cut off.

A morning call event may be controlled in a manner similar to that of the above description. In particular, whether to operate a projector module can be controlled according to an automatic power cutoff of a projector module, a user's manipulation or a status set up in a memory.

Battery status represents another system event. If a remaining battery level is lower than a prescribed level, it is generally necessary to secure the battery remaining level to preserve the ability to make a phone call. Hence, an operation of a projector module may be discontinued. Of course, before a projector module operation is cut off, an announcement message may be provided for informing a user of a cause of the cutoff.

FIGS. 8A to 8D are exemplary diagrams for embodiments of cutting off an operation of a projector module according to a user event occurrence.

Figure 8A:
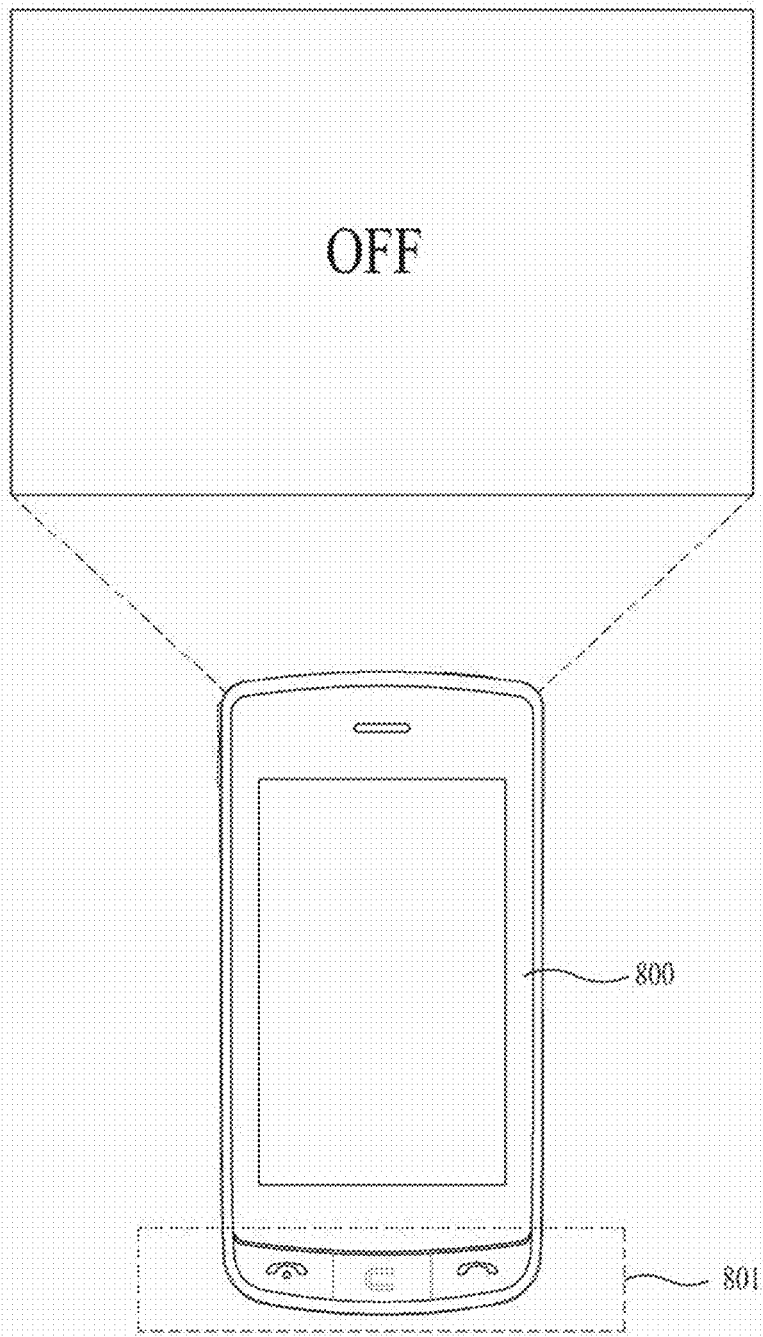

Referring to FIG. 8A, if a function manipulating button provided to a prescribed portion of a terminal 800 is pressed, a display image currently output via a projector module may be paused, or an operation power of the projector module may be cut off.

Referring to FIG. 8B, while display information is displayed on a projection plane using a projector module, if a user performs a direct/proximity touch to a touchscreen 151, a controller pauses an output operation through the projector module.

Figure 8C:
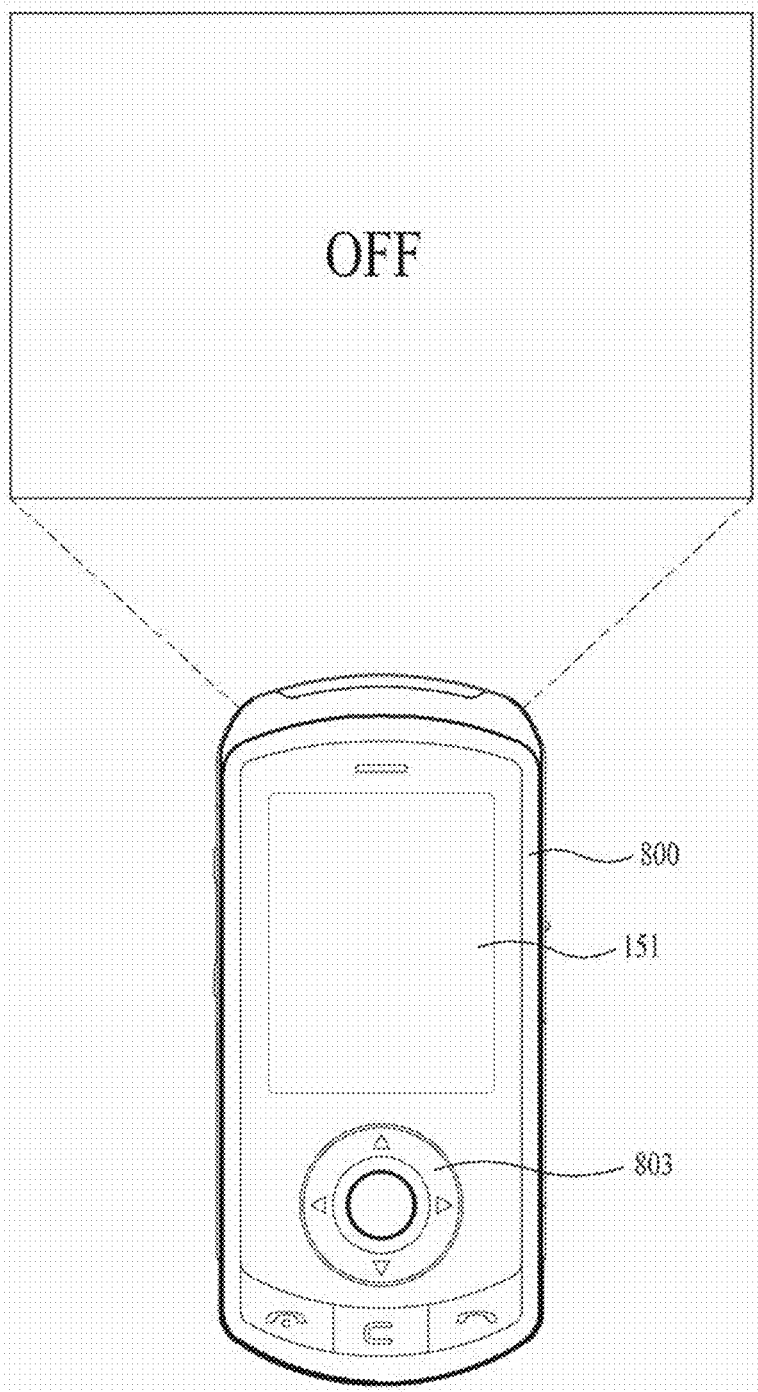

Referring to FIG. 8C, if a user manipulation is performed on a navigation key of a terminal, an output operation of a projector module is stopped. In FIG. 8C, a navigation key is provided to a topside of a slide type terminal. In case of a folder type terminal, while a projector module is activated after opening a folder, if a navigation key is manipulated, an operation of the projector module is stopped.

Figure 8D:
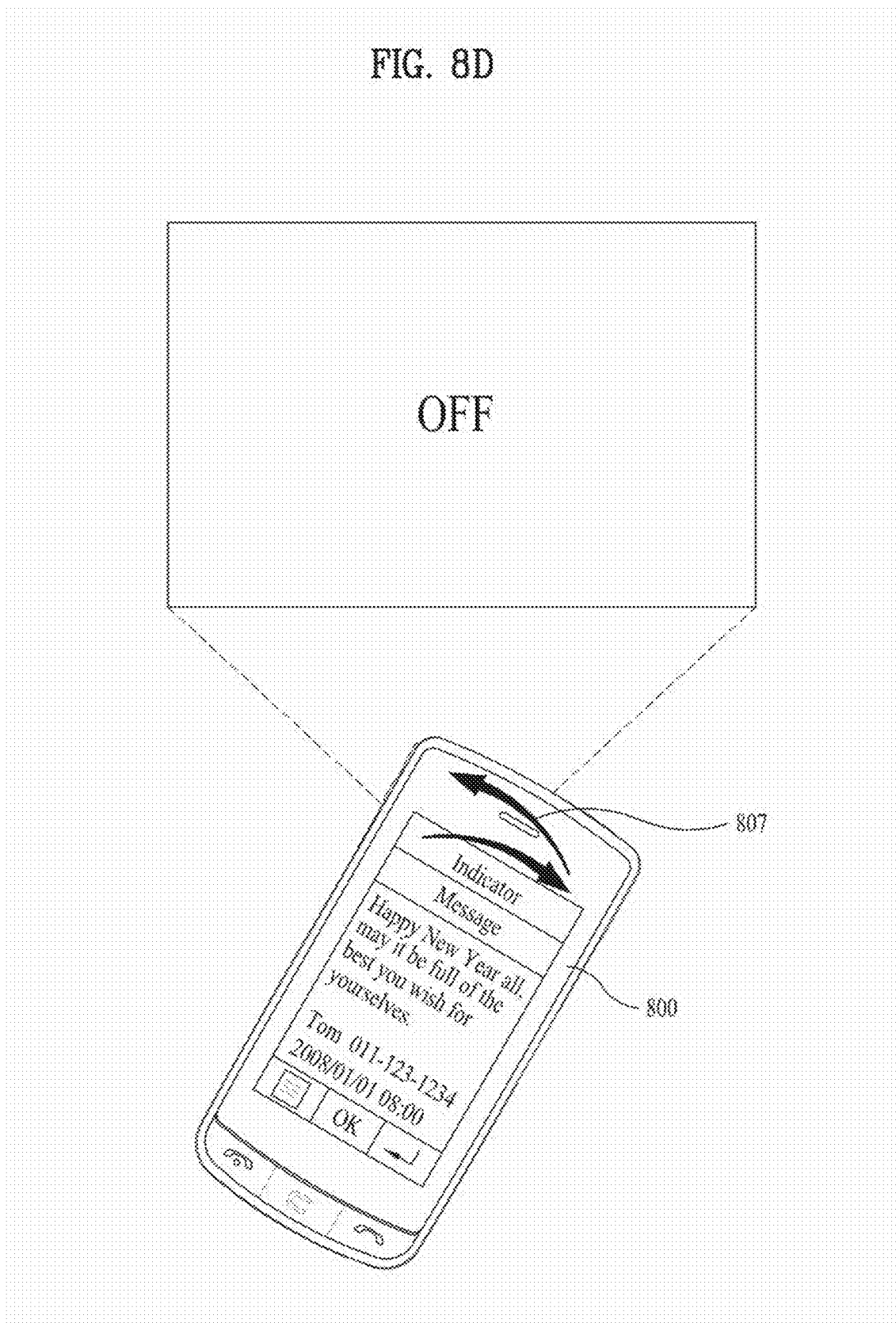

FIG. 8D exemplarily shows a case that a terminal body is moved in the course of a display operation through a projector module. A terminal 800 is provided with a motion sensor capable of detecting a motion of the terminal. In this case, the motion sensor is a common name of such a sensor capable of detecting a two or three dimensional motion as an inclination sensor, an acceleration sensor, a gyro sensor and the like. In the course of a display operation through a projector, if a user intentionally or unintentionally moves or inclines a terminal body over a prescribed range, as illustrated by the arrows 807, an operation of a projector module may be cut off.

Figure 9B:
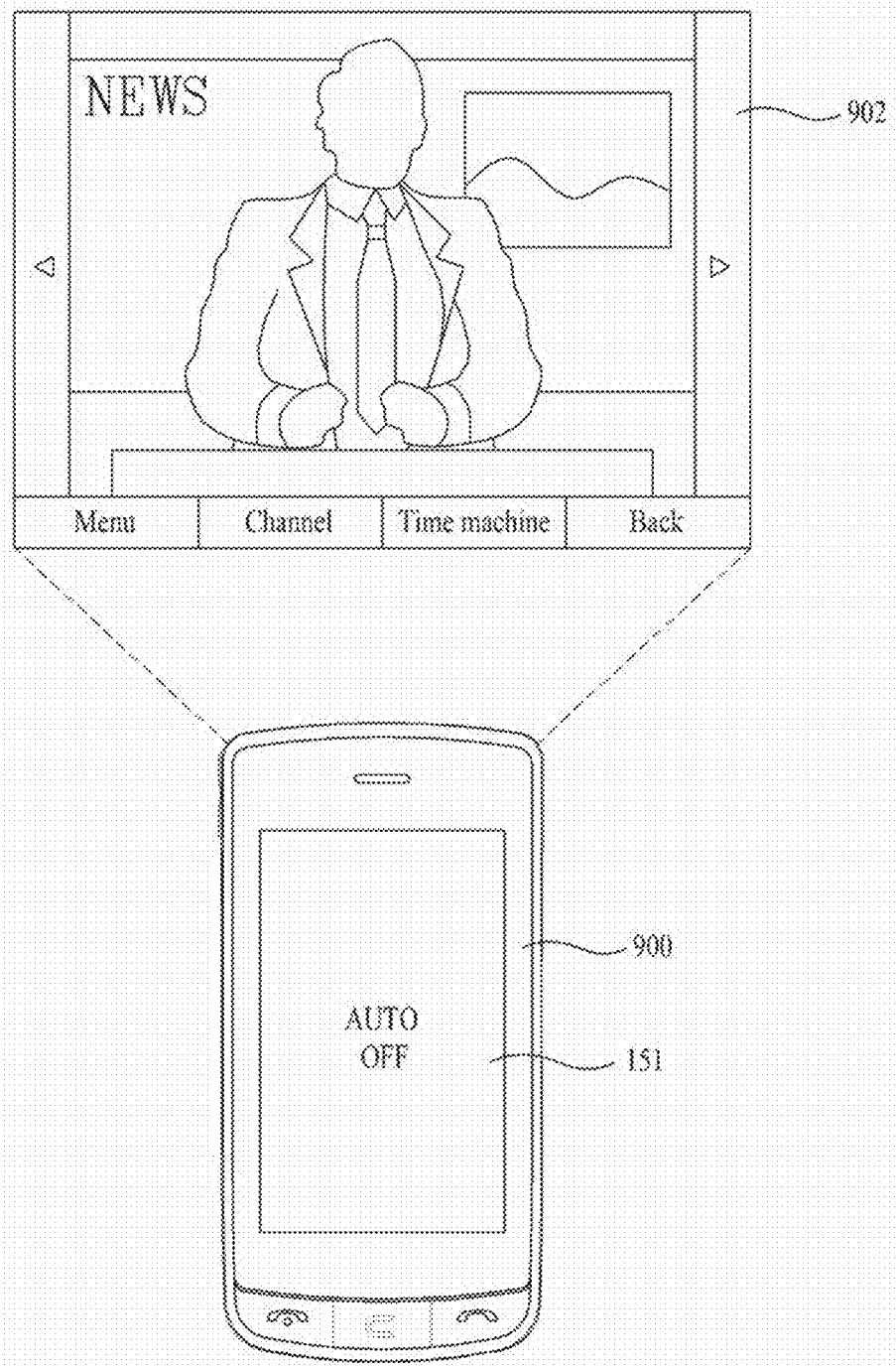
Figure 9C:
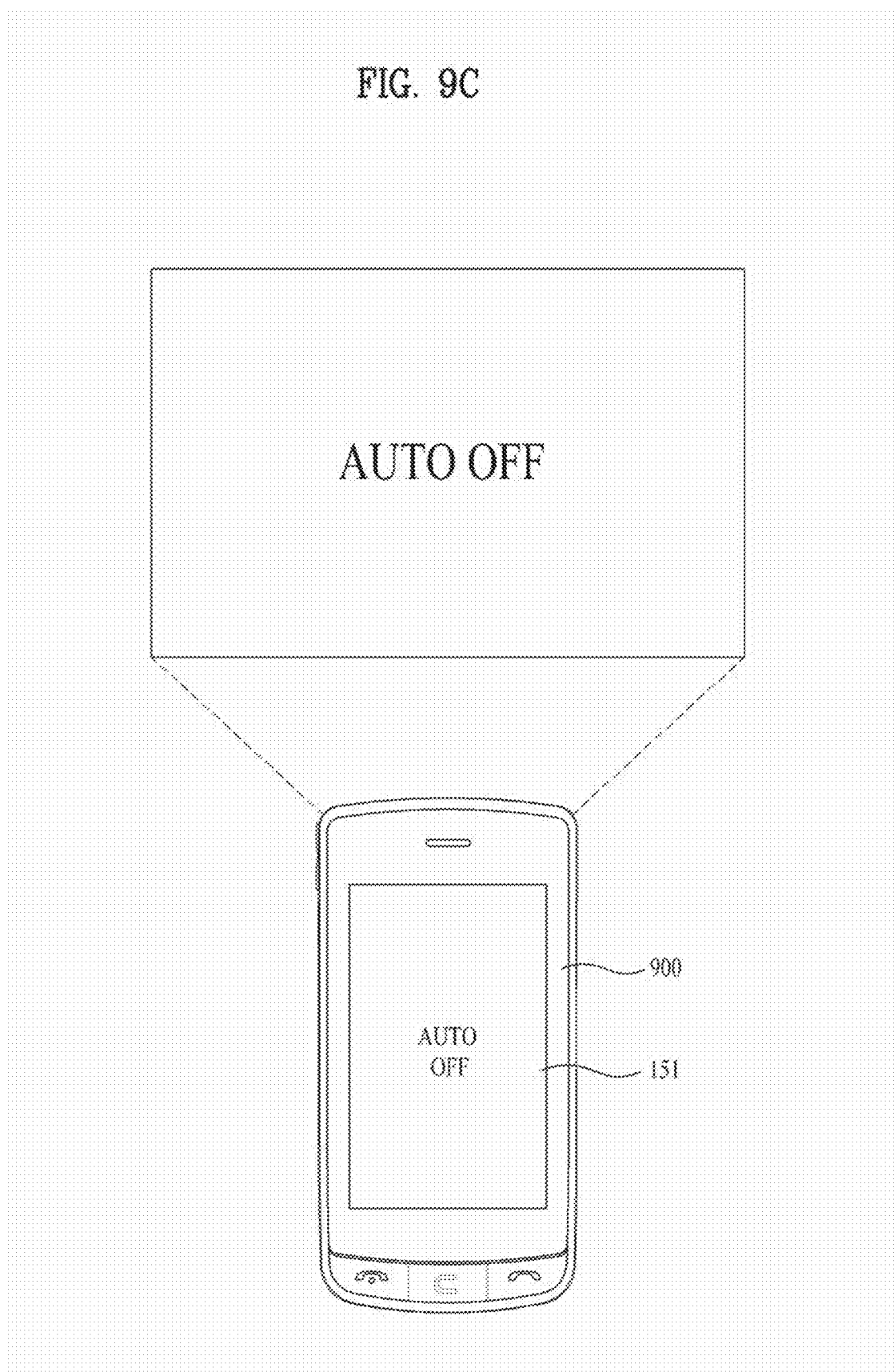

FIGS. 9A to 9C are exemplary diagrams for embodiments of controlling a power saving according to a lapse of time.

Referring to FIG. 9A, while a photo 909 included in a photo album is displayed using a projector module of a mobile terminal 900, if a selection for another photo is not made until a prescribed time according to a user setup goes by, a display through the projector module is cut off.

Referring to FIG. 9B, when an image is projected onto projector plane 902 from a projector module, an output operation of a display unit 151 is cut off (e.g., power to display 151 of FIG. 1 is cut off) while maintaining an operation of the projector module to prepare for a case that an output through the display unit of a terminal body is unnecessary.

Referring to FIG. 9C, both outputs through a projector module and a display unit are cut off following, for example, a lapse of time. In an embodiment, a user may input any signal to reestablish operation of one or both displays. A power savings may thereby be achieved.

Figure 10A:
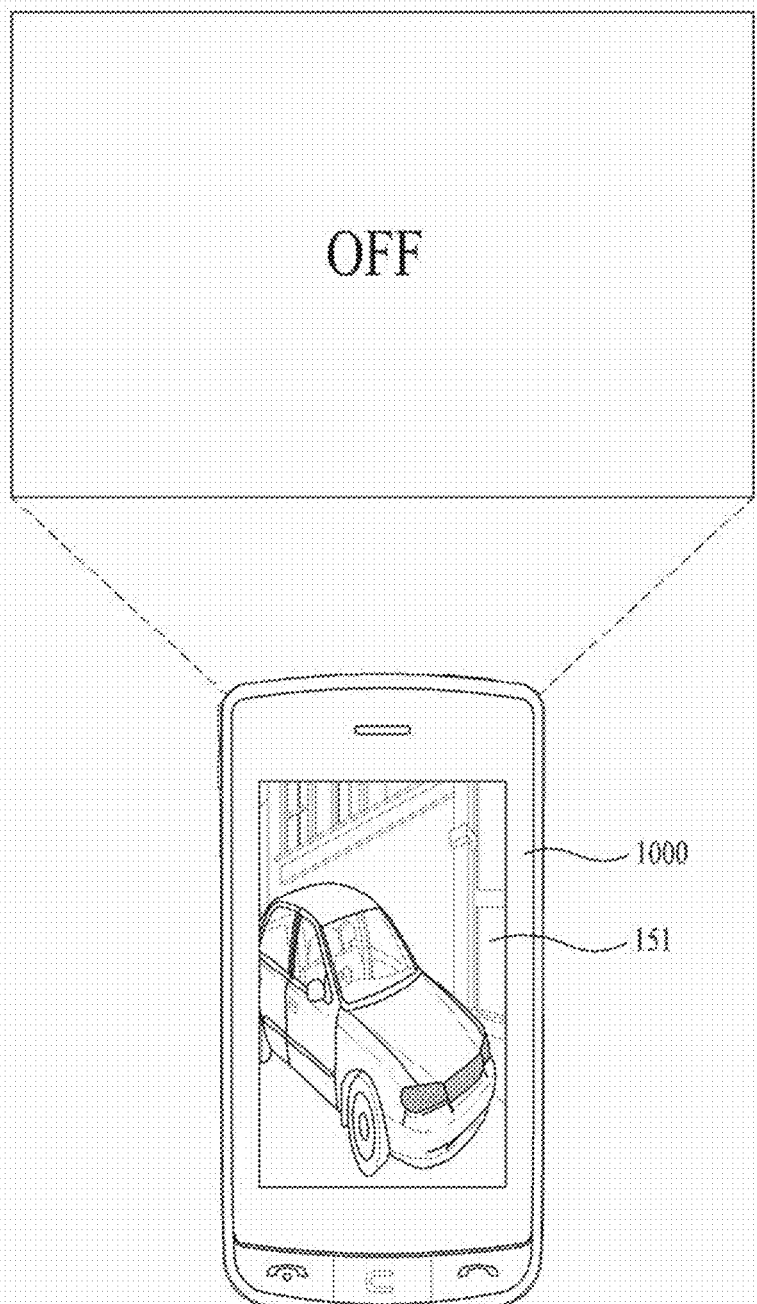
FIGS. 10A to 10C are exemplary diagrams for embodiments of controlling an operation power of a projector module.
Figure 10B:
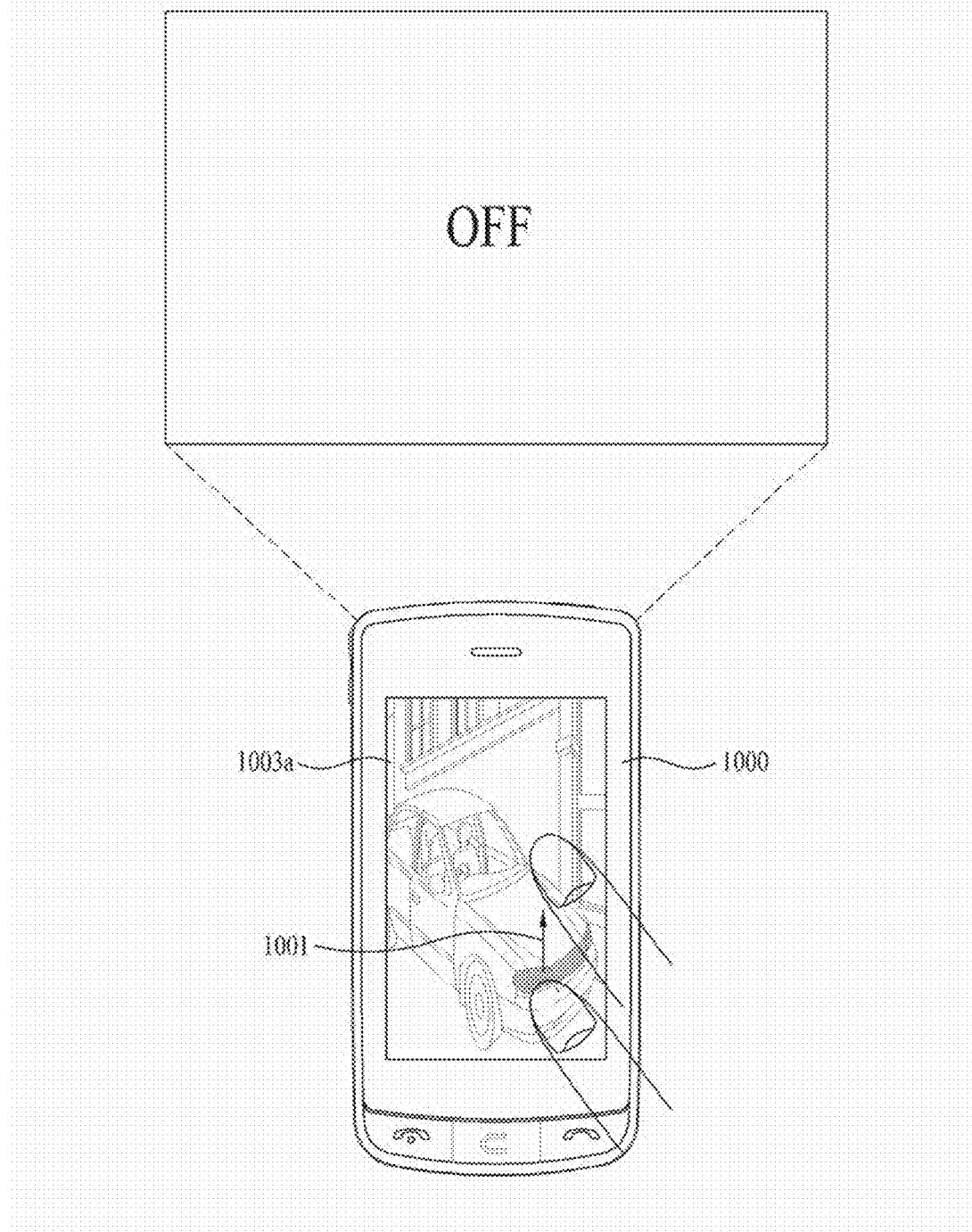
Figure 10C:
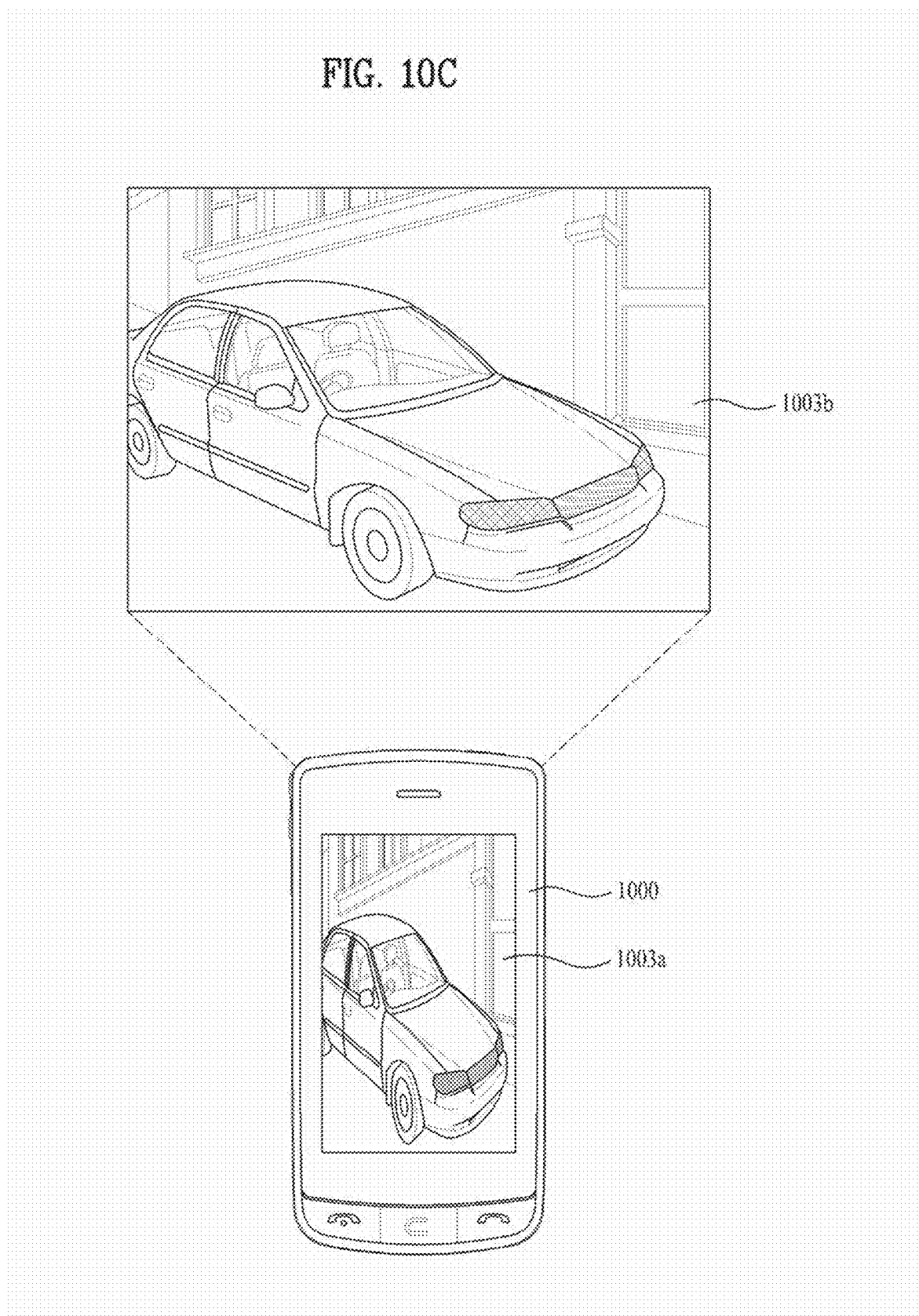

FIGS. 10A to 10C are exemplary diagrams for embodiments of controlling an operation power of a projector module of a mobile terminal 1000.

Referring to FIG. 10A, while a projector module is not being operated, a prescribed display operation may be performed through a display unit 151 of a terminal.

Subsequently, referring to FIG. 10B, an exemplary direct/proximity touch on an image 1003*a* is performed on a touchscreen by a finger, and the finger is dragged in a direction of a projection plane of a projector as illustrated by arrow 1001.

Finally, referring to FIG. 10C, a same or substantially identical image 1003*b* displayed on the display unit is displayed through the projector module.

In an embodiment, while a projector module is turned off and a photo album is displayed through a display unit, if a prescribed photo in the photo album is direct/proximity-touched & dragged in a direction of a projector projection plane, the selected photo in the displayed may be displayed on the projector plane.

Figure 11C:
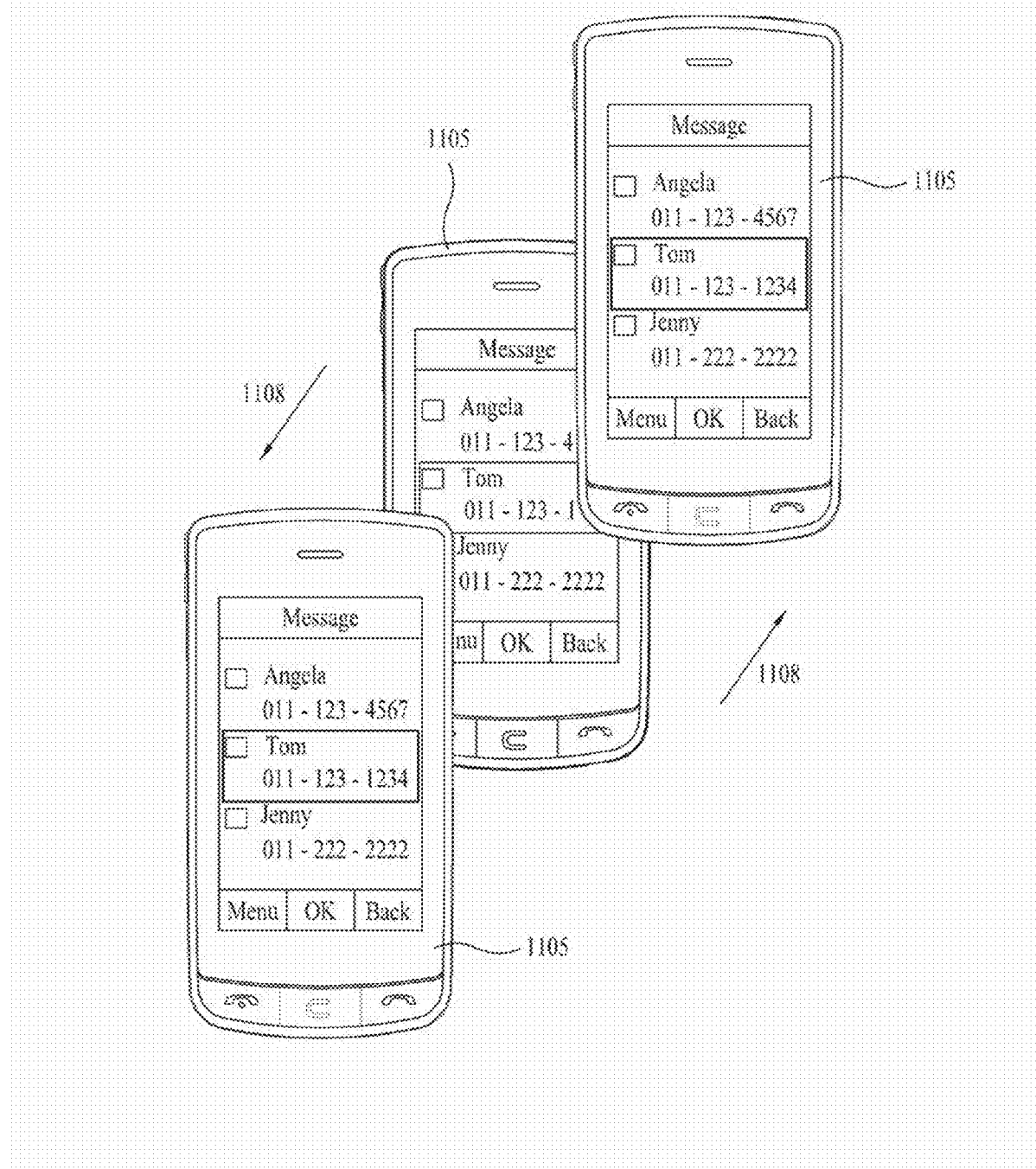

FIGS. 11A to 11C are exemplary diagrams for embodiments of a motion of a terminal body 1105.

As mentioned in the foregoing description of FIG. 8D, while a display operation through a projector module is performed, if a motion of a terminal body is detected by a motion sensor, an operation power o the projector module may be cut off.

Motion types of the terminal body that can be detected by the motion sensor for purposes of controlling power of the displays are shown in FIGS. 11A to 11C, respectively.

In particular, a power of the projector module may be cut off by recognizing a horizontal motion in right or left direction on a plane, as shown by arrow 1104 in FIG. 11A, an inclination in a manner of rotating centering on a prescribed position, as shown by arrows 1006 in FIG. 11B, or a motion in a diagonal direction, as shown by arrows 1108 in FIG. 11C.

It may not be desirable in some embodiments to cut off power to the projector module in response to detecting a back and forth motion on a plane against a projector projection plane. In these embodiments, this type of motion may be instead reserved for changing the distance between the projector module and the projector projection plane. By reserving this motion for such purposes, an image displayed on the projector projection plane may be enlarged or reduced as needed. Therefore, in these embodiments, the power saving configuration of the projector module for the back and forth motion of the terminal can be changed according to a user setup with control information stored in memory.

Figure 12A:
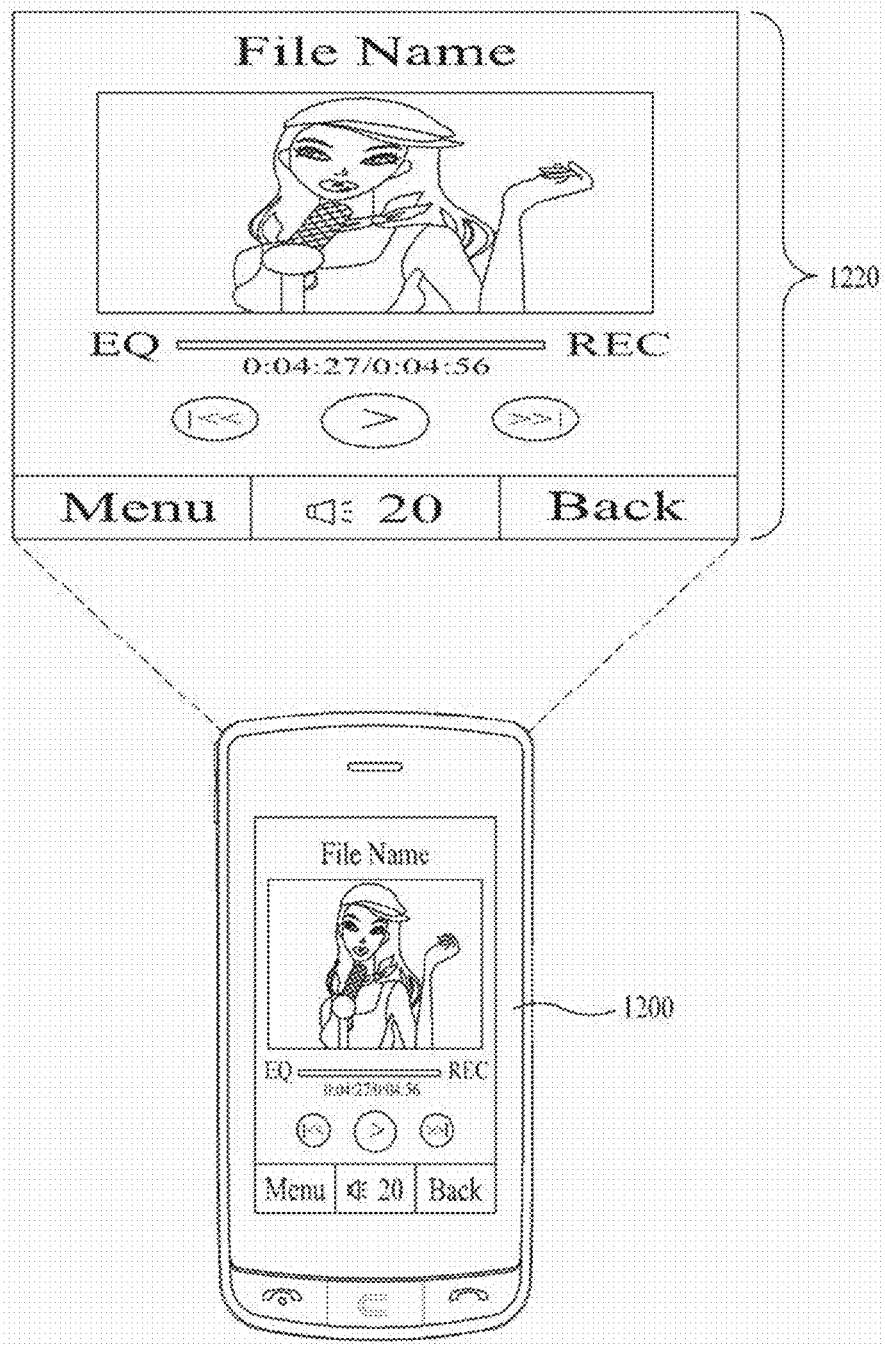
FIGS. 12A to 12C are exemplary diagrams for a method of controlling a power of a projector according to another embodiment of the present invention.
Figure 12B:
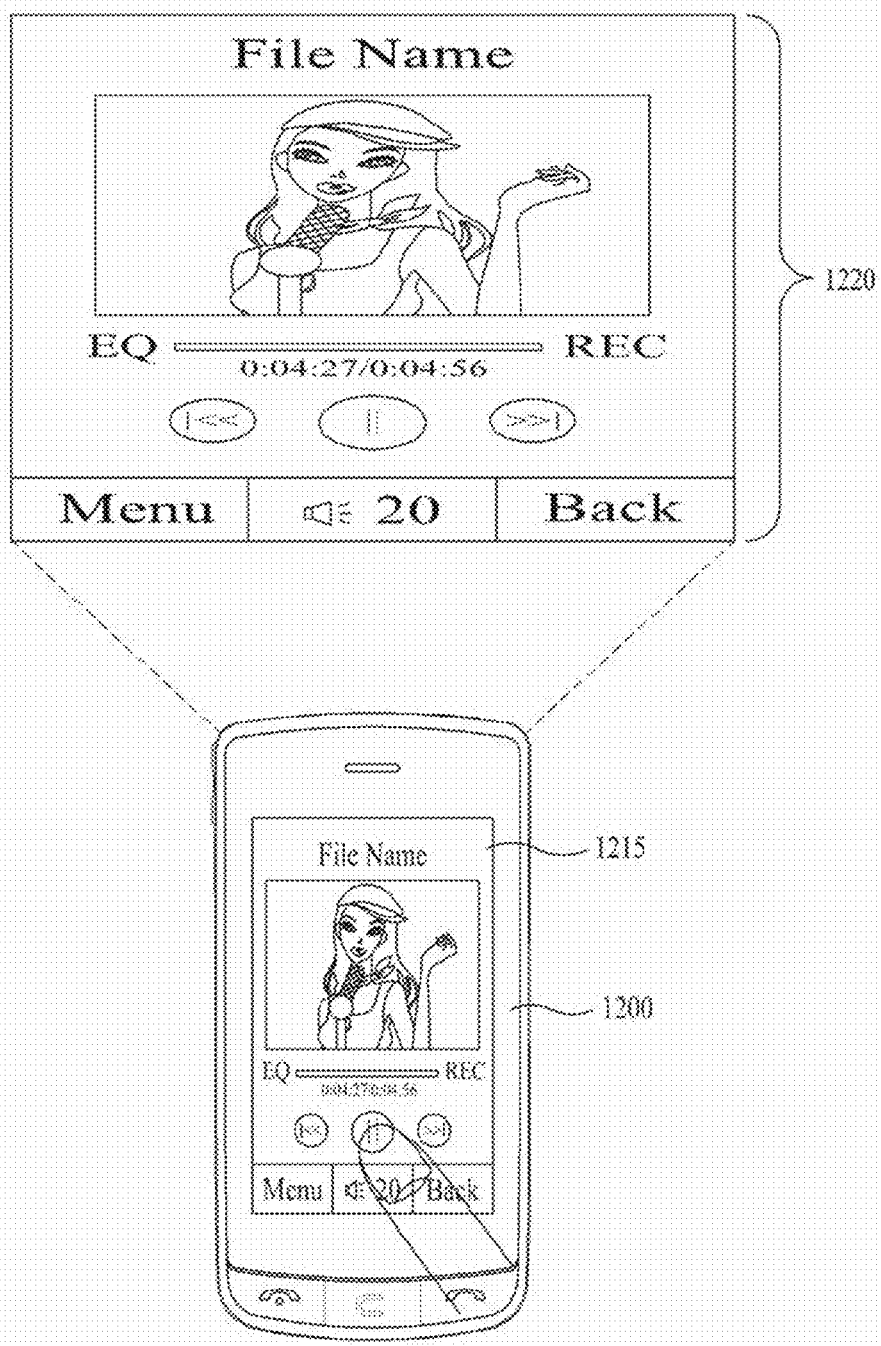
Figure 12C:
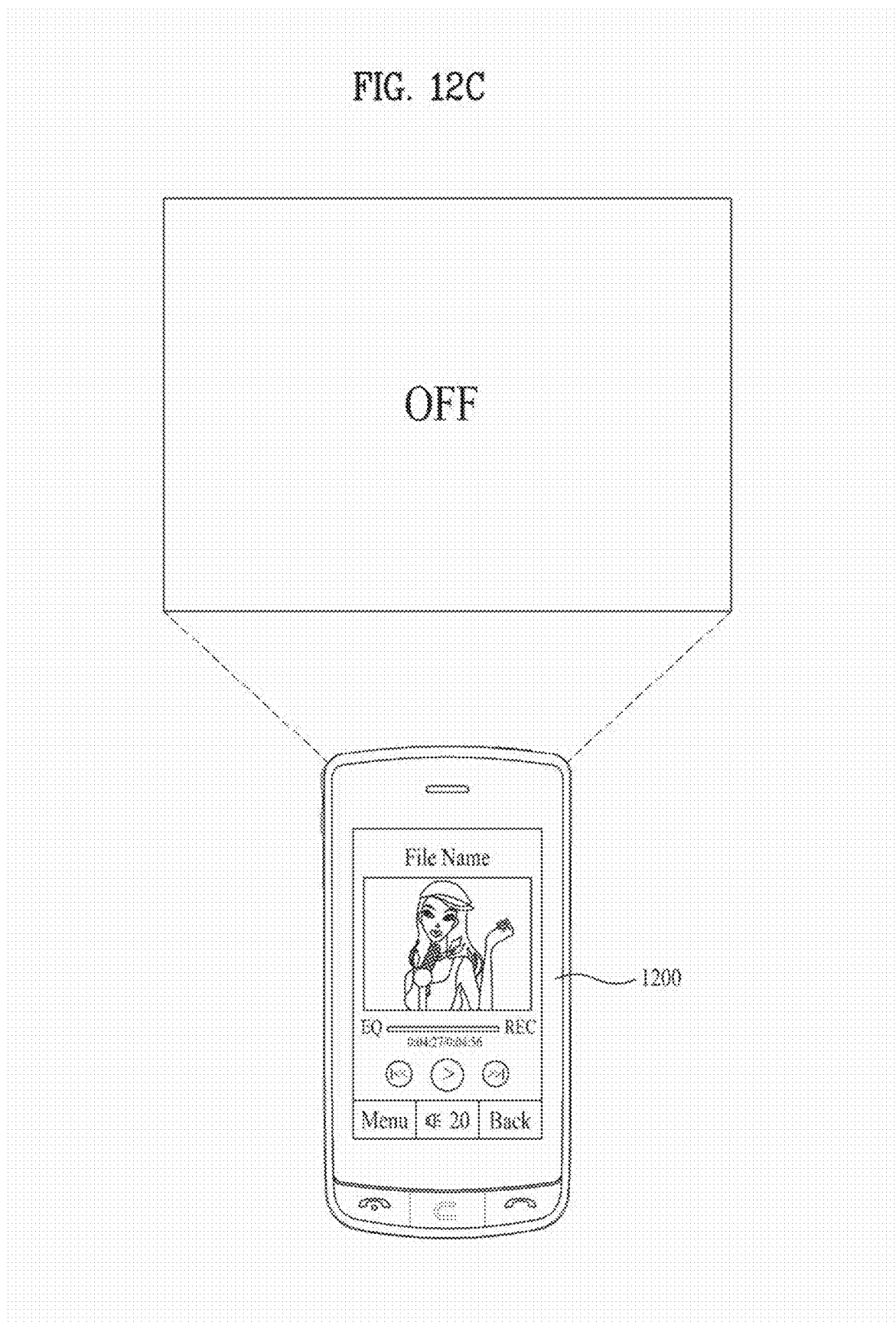

FIGS. 12A to 12C are exemplary diagrams for a method of controlling a power of a projector module of a mobile terminal 1200 according to another embodiment of the present invention.

While such a dynamic object 1220 as a moving picture, a broadcast, an MP3 audio file, a speech, an animation, a navigation object and the like may be output via a projector module, as shown in FIG. 12A, if a pause key 1215 is pressed, as shown in FIG. 12B, the output via the projector module is paused, as shown in FIG. 12C.

If a user presses (resumes) a play button again, the dynamic object output 1220 via the projector module is activated again.

Figure 13A:
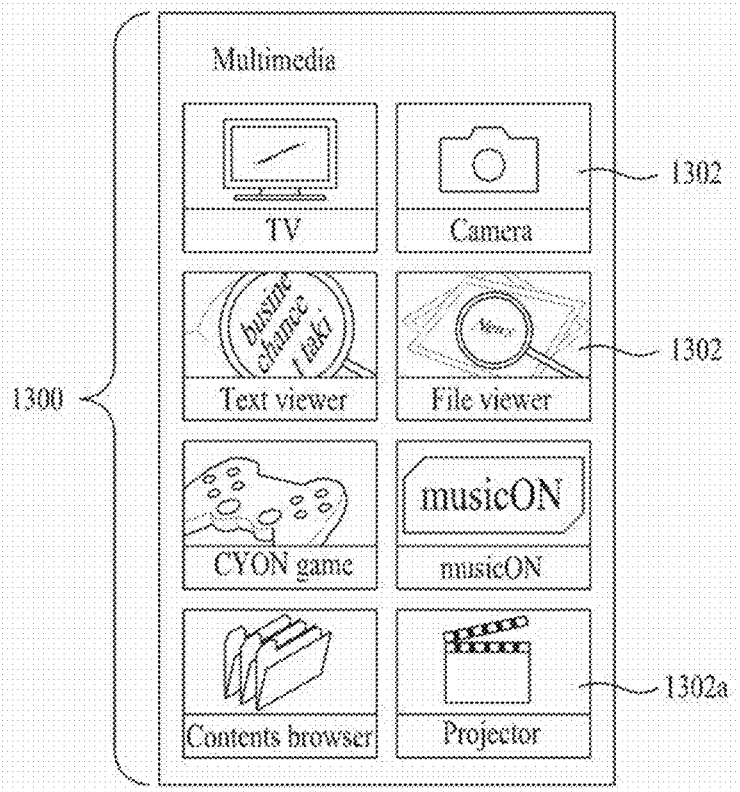
FIG. 13A and FIG. 13B are exemplary diagrams for user settings to implement certain embodiments of the present invention.
Figure 13B:
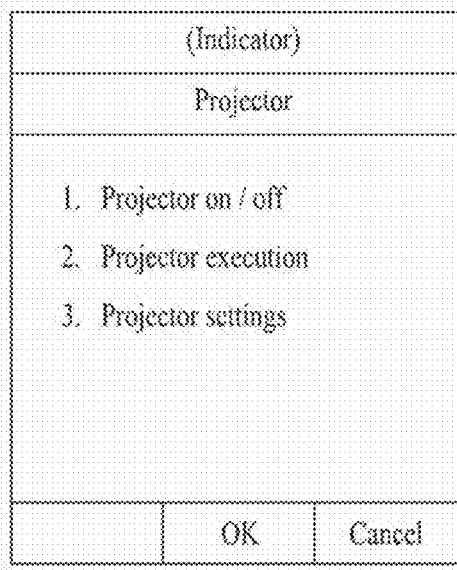

FIG. 13A and FIG. 13B are exemplary diagrams for user settings to implement an embodiment of the present invention.

In an embodiment, a multimedia menu 1300 is included in a basic menu of a mobile terminal. If a user selects the multimedia menu, a plurality of sub-menus 1302, as shown in FIG. 13A, are displayed. For a control of a projector module according to the present invention, 'projector' may be included as a sub-menu of the multimedia menu as shown. If a user selects the sub-menu 'projector' 1302a, a menu 1304 including various settings '1', '2', and '3' for a projector use, as shown in FIG. 13B, is displayed.

Figure 14:
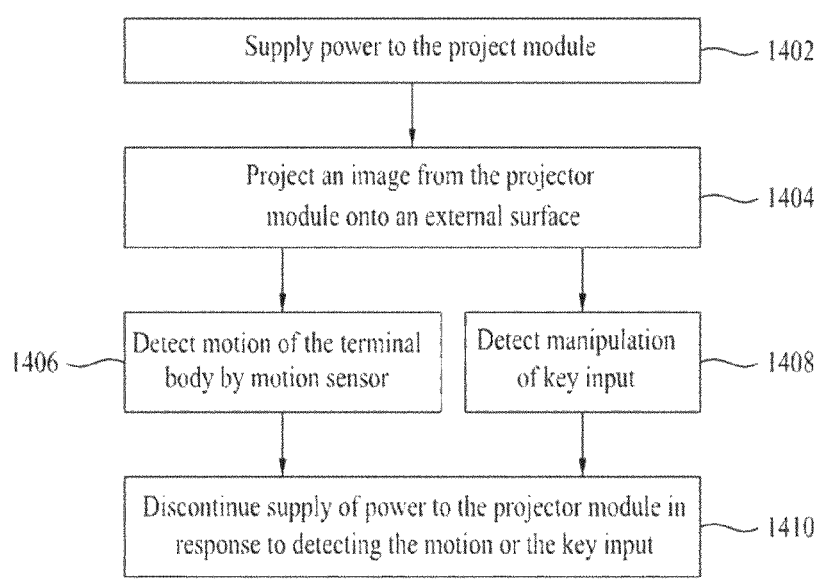
FIG. 14 is an exemplary flow diagram illustrating a method for saving power in a mobile terminal configured with a projector module according to an embodiment of the present invention.

FIG. 14 is an exemplary flow diagram illustrating a method for saving power in a mobile terminal configured with a projector module according to an embodiment of the present invention. Power is supplied to the projector module from the power supply (1402). An image is projected from the projector module onto an external surface (1404). The image may either be a still image or multiple images (such as a continuing series of frames). Thereupon, a specified event may occur. In the example of FIG. 14, two possible events are illustrated. In one event, the mobile terminal is equipped with a motion sensor, and the motion sensor detects a motion of the terminal body (e.g., the user moves the terminal body back and forth) (1406). Thus, for example, the motion sensor may provide a signal to the controller indicative of the movement, which the controller may thereupon interpret accordingly to represent terminal movement.

In the other event, the controller detects manipulation of a key input (1408). For example, a user depresses a pause key. As a result of these events, in one embodiment, the controller may discontinue the supply of power to the projector module in response to detecting the motion or recognizing the key input.

According to one embodiment of the present invention, the above-described methods can be implemented in a program recorded medium as computer-readable codes. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a terminal body;
a touch screen located on the terminal body;
a motion sensor configured to detect motion of the terminal body;
a projector module configured to project an image onto an external surface, the projector module coupled to the terminal body and positioned in a specific direction to face the external surface;
a power supply configured to supply power to the projector module; and
a controller configured to:
identify an occurrence of a first motion and a second motion based upon the detected motion of the terminal body, the detected motion occurring while the projector module is operating, the first motion occurring when the terminal body is moved along or rotated on a plane that is perpendicular to the specific direction and the second motion occurring when the terminal body is moved in a direction parallel to the specific direction;
control the power supply to discontinue supplying power to the projector module while continuing to supply power to the touch screen upon detection of the occurrence of the first motion;
control the power supply to resume supplying power to the projector module upon detection of a touch and drag input on the touch screen in a direction toward the projector module;
control the power supply to discontinue supplying power to the projector module while continuing to supply power to the touch screen upon detection of the occurrence of the second motion when the mobile terminal is in a power saving mode; and
control the power supply to continue supplying power to the projector module upon detection of the occurrence of the second motion when the mobile terminal is not in the power saving mode such that the second motion causes enlargement or reduction of the image projected onto the external surface.

2. The mobile terminal of claim 1, wherein the controller is further configured to:
control the power supply to discontinue supplying power to the projector module in response to at least receipt of an input of a pause command, manipulation of a key, receipt of a voice call by the mobile terminal, receipt of a text message by the mobile terminal, an occurrence of an alarm event, an occurrence of a wake-up call, an occurrence of a low battery power status of the mobile terminal, a lapse of a predetermined time without mobile terminal user activity or a predetermined time without receipt of radio signals by the mobile terminal.

3. The mobile terminal of claim 1, wherein:
the controller is further configured to control the power supply to discontinue supplying power to the projector module based on at least one received input, the at least received input comprising an instruction to discontinue supplying power in response to an answering of a voice call or receipt of a command for reviewing a text message.

4. The mobile terminal of claim 3, wherein the at least received input further comprises an executed instruction to display caller reception information in the projected image.

5. The mobile terminal of claim 4, wherein the caller reception information is displayed concurrently with and at least partially overlaps other information displayed in the projected image.

6. The mobile terminal of claim 5, wherein the caller reception information is displayed in a specified portion of the projected image.

7. The mobile terminal of claim 1, wherein the controller is further configured to control the projector module to project an image selected by the touch and drag input when the power supply resumes supplying power to the projector module.

8. A method for saving power in a mobile terminal, the mobile terminal comprising a terminal body, a touch screen disposed on the terminal body and a projector module coupled to the terminal body, the projector module positioned in a specific direction to face an external surface, the method comprising:
   supplying power to the projector module;
   projecting an image from the projector module onto the external surface;
   detecting a motion of the terminal body via a motion sensor coupled to the terminal body;
   identifying an occurrence of a first motion and a second motion based upon the detected motion of the terminal body, the detected motion occurring while the projector module is operating, the first motion occurring when the terminal body is moved along or rotated on a plane that is perpendicular to the specific direction and the second motion occurring when the terminal body is moved in a direction parallel to the specific direction;
   discontinuing supplying power to the projector module while continuing supplying power to the touch screen in response to the occurrence of the first motion;
   resuming supplying power to the projector module upon detection of a touch and drag input on the touch screen in a direction toward the projector module;
   discontinuing supplying power to the projector module while continuing to supply power to the touch screen upon detection of the occurrence of the second motion when the mobile terminal is in a power saving mode; and
   continuing supplying power to the projector module in response to the occurrence of the second motion when the mobile terminal is not in the power saving mode such that the second motion causes enlargement or reduction of the image projected onto the external surface.

9. The method of claim 8, further comprising discontinuing supplying power to the projector module in response to receipt of an input.

10. The method of claim 9, wherein the received input comprises a pause command received via an input unit of the mobile terminal.

11. The method of claim 9, wherein the received input comprises manipulation of a key.

12. The method of claim 8, further comprising projecting an image selected by the touch and drag input when the power supply resumes supplying power to the projector module.

* * * * *